(12) United States Patent
Shionoiri et al.

(10) Patent No.: US 9,898,194 B2
(45) Date of Patent: Feb. 20, 2018

(54) SEMICONDUCTOR DEVICE WITH VOLATILE AND NON-VOLATILE MEMORIES TO RETAIN DATA DURING POWER INTERRUPTION

(71) Applicant: SEMICONDUCTOR ENERGY LABORATORY CO., LTD., Atsugi-shi, Kanagawa-ken (JP)

(72) Inventors: Yutaka Shionoiri, Kanagawa (JP); Tomoaki Atsumi, Kanagawa (JP); Masaaki Hiroki, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 931 days.

(21) Appl. No.: 14/249,903

(22) Filed: Apr. 10, 2014

(65) Prior Publication Data

US 2014/0310533 A1    Oct. 16, 2014

(30) Foreign Application Priority Data

Apr. 12, 2013  (JP) .................................. 2013-083550

(51) Int. Cl.
*G06F 3/06*   (2006.01)
*G06F 1/32*   (2006.01)
(Continued)

(52) U.S. Cl.
CPC .................. *G06F 3/06* (2013.01); *G06F 1/00* (2013.01); *G06F 1/32* (2013.01); *G06F 1/3287* (2013.01);
(Continued)

(58) Field of Classification Search
CPC .. G06F 2221/2129; G06F 21/57; G06F 21/71; G06F 21/78; G06F 21/64;
(Continued)

(56) References Cited

U.S. PATENT DOCUMENTS 5,731,856 A    3/1998 Kim et al.
5,744,864 A    4/1998 Cillessen et al.
(Continued)

FOREIGN PATENT DOCUMENTS

EP    1737044 A    12/2006
EP    2226847 A    9/2010
(Continued)

OTHER PUBLICATIONS

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.
(Continued)

*Primary Examiner* — Richard Elms
*Assistant Examiner* — Ajay Ojha
(74) *Attorney, Agent, or Firm* — Fish & Richardson P.C.

(57) ABSTRACT

An object is to solve all of the following problems caused when a volatile register and a non-volatile register are used as registers in a processor: degradation of the integrity of data stored in the non-volatile register; loss of data security due to the processor and a non-volatile memory device that are provided apart from each other; and slow data processing speed due to wiring delay or the like caused by these devices provided apart from each other. When data maintained in the volatile register is stored in the non-volatile register before supply of power supply voltage is stopped, the data is encrypted by an encryption circuit and stored in a non-volatile memory device that is provided separately from the processor. Then, the data stored in the non-volatile register is compared with the compressed and encrypted data stored in the non-volatile memory device.

10 Claims, 13 Drawing Sheets

(51) Int. Cl.
*G06F 12/14* (2006.01)
*G11C 14/00* (2006.01)
*H04L 9/00* (2006.01)
*G06F 1/00* (2006.01)
*G06F 21/81* (2013.01)

(52) U.S. Cl.
CPC ........ *G06F 3/0619* (2013.01); *G06F 12/1408* (2013.01); *G06F 21/81* (2013.01); *G11C 14/00* (2013.01); *G11C 14/0081* (2013.01); *H04L 9/00* (2013.01)

(58) Field of Classification Search
CPC ........... G06F 3/0679; G06F 2212/1052; G06F 2212/402; G06F 21/81; G06F 1/32; G06F 1/00; G11C 29/52; G11C 29/42
See application file for complete search history.

(56) References Cited

U.S. PATENT DOCUMENTS

| | | | |
|---|---|---|---|
| 5,943,421 A * | 8/1999 | Grabon | G06F 12/1408 380/269 |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 6,914,845 B2 * | 7/2005 | Ooishi | G11C 14/0081 365/154 |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al. | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 8,575,985 B2 | 11/2013 | Ohmaru et al. | |
| 9,336,845 B2 | 5/2016 | Ohshima et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0195664 A1 | 9/2005 | Ooishi | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0201592 A1 | 8/2008 | Lawrence et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0259856 A1 * | 10/2009 | Tsuruta | G06F 21/52 713/189 |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2012/0230078 A1 * | 9/2012 | Fujita | G11C 14/00 365/65 |
| 2013/0039487 A1 * | 2/2013 | McGrew | H04L 63/0435 380/44 |
| 2014/0003146 A1 | 1/2014 | Yoneda et al. | |
| 2014/0048802 A1 | 2/2014 | Ohmaru et al. | |
| 2016/0274804 A1 * | 9/2016 | Tsuji | G06F 1/3287 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |

(56) References Cited

FOREIGN PATENT DOCUMENTS

| JP | 2008-204459 A | 9/2008 |
|----|---------------|--------|
| JP | 2010-026791 A | 2/2010 |
| JP | 2013-009323 A | 1/2013 |
| WO | WO-2004/114391 | 12/2004 |
| WO | 2009/136442 A1 | 11/2009 |

OTHER PUBLICATIONS

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Kimizuka.N. et al., "Spinel,YbFe2O4, and Yb2Fe3O7 Types of Structures for Compounds in the In2O3 and Sc2O3-A2O3-Bo Systems [A; Fe, Ga, or Al; B: Mg, Mn, Fe, Ni, Cu,or Zn] at Temperatures Over 1000° C.", Journal of Solid State Chemistry, 1985, vol. 60, pp. 382-384.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Kitzerow.H et al., "Observation of Blue Phases in Chiral Networks", Liquid Crystals, 1993, vol. 14, No. 3, pp. 911-916.

Kimizuka.N. et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Kikuchi.H et al., "Polymer-Stabilized Liquid Crystal Blue Phases", Nature Materials, Sep. 2, 2002, vol. 1, pp. 64-68.

Tsuda.K et al., "Ultra Low Power Consumption Technologies for Mobile TFT-LCDs", IDW '02 : Proceedings of the 9th International Display Workshops, Dec. 4, 2002, pp. 295-298.

Nomura.K et al., "Thin-Film Transistor Fabricated in Single-Crystalline Transparent Oxide Semiconductor", Science, May 23, 2003, vol. 300, No. 5623, pp. 1269-1272.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Lee.H et al., "Current Status of, Challenges to, and Perspective View of AM-OLED", IDW '06 : Proceedings of the 13th International Display Workshops, Dec. 7, 2006, pp. 663-666.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hirao.T et al., "Novel Top-Gate Zinc Oxide Thin-Film Transistors (ZnO TFTs) for AMLCDS", Journal of the SID, 2007, vol. 15, No. 1, pp. 17-22.

Park.S et al., "Challenge to Future Displays: Transparent AM-OLED Driven by PEALD Grown ZnO TFT", IMID '07 Digest, 2007, pp. 1249-1252.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Miyasaka.M, "SUFTLA Flexible Microelectronics on Their Way to Business", SID Digest '07 : SID International Symposium Digest of Technical Papers, 2007, vol. 38, pp. 1673-1676.

Kurokawa.Y et al., "UHF RFCPUS on Flexible and Glass Substrates for Secure RFID Systems", Journal of Solid-State Circuits, 2008, vol. 43, No. 1, pp. 292-299.

Jeong.J et al., "3.1: Distinguished Paper: 12.1-Inch WXGA AMOLED Display Driven by Indium-Gallium-Zinc Oxide TFTs Array", SID Digest '08 SID International Symposium Digest of Technical Papers, May 20, 2008, vol. 39, No. 1, pp. 1-4.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Takahashi.M et al., "Theoretical Analysis of IGZO Transparent Amorphous Oxide Semiconductor"IDW '08 : Proceeding of the 15th International Display Workshops, Dec. 3, 2008, pp. 1637-1640.

Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Nowatari.H et al., "60.2: Intermediate Connector With Suppressed Voltage Loss for White Tandem OLEDs", SID Digest SID International Symposium Digest of Technical Papers, May 31, 2009, vol. 40, pp. 899-902.

Jin.D et al., "65.2:Distinguished Paper:World-Largest (6.5") Flexible Full Color Top Emission AMOLED Display on Plastic Film and its Bending Properties", SID Digest '09 : SID International Symposium Digest of Technical Papers, May 31, 2009, pp. 983-985.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Osada.T et al., "15.2: Development of Driver-Integrated Panel using Amorphous In—Ga—Zn-Oxide TFT", SID Digest '09 : SID International Symposium Diget of Technical Papers, May 31, 2009, pp. 184-187.

Ohara.H et al., "21.3:4.0 in. QVGA AMOLED Display Using In—Ga—Zn-Oxide TFTs With a Novel Passivation Layer", SID Digest '09 : SID International Symposium Digest of Technical Papers, May 31, 2009, pp. 284-287.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Osada.T et al., "Development of Driver-Integrated Panel Using Amorphous In13 Ga—Zn-Oxide TFT", AM-FPD '09 Digest of Technical Papers, Jul. 1, 2009, pp. 33-36.

(56) References Cited

OTHER PUBLICATIONS

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Park.J et al., "High performance amorphous oxide thin film transistors with self-aligned top-gate structure", IEDM 09: Technical Digest of International Electron Devices Meeting, Dec. 7, 2009, pp. 191-194.

Nakamura.M, "Synthesis of Homologous Compound with New Long-Period Structure", NIRIM Newsletter, Mar. 1, 1995, vol. 150, pp. 1-4.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Orita.M et al., "Amorphous transparent conductive oxide InGaO3(ZnO)m (m <4):a Zn4s conductor", Philosophical Magazine, 2001, vol. 81, No. 5, pp. 501-515.

Janotti.A et al., "Oxygen Vacancies in ZnO", Appl. Phys. Lett. (Applied Physics Letters), 2005, vol. 87, pp. 122102-1-122102-3.

Clark.S et al., "First Principles Methods Using CASTEP", Zeitschrift fur Kristallographie, 2005, vol. 220, pp. 567-570.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Janotti.A et al., "Native Point Defects in ZnO", Phys. Rev. B (Physical Review. B), Oct. 4, 2007, vol. 76, No. 16, pp. 165202-1-165202-22.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States", SID Digest '08 SID International Symposium Digest of Technical Papers, May 20, 2008, vol. 39, pp. 1277-1280

Oba.F et al., "Defect energetics in ZnO: A hybrid Hartree-Fock density functional study", Phys. Rev. B. (Physical Review. B), 2008, vol. 77, pp. 245202-1-245202-6.

Kim.S et al., "High-Performance oxide thin film transistors passivated by various gas plasmas", 214th ECS Meeting, 2008, No. 2317, ECS.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Mo.Y et al., "Amorphous Oxide TFT Backplanes for Large Size AMOLED Displays", IDW '08 : Proceedings of the 6th International Display Workshops, Dec. 3, 2008, pp. 581-584.

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Nomura.K et al., "Carrier transport in transparent oxide semiconductor with intrinsic structural randomness probed using single-crystalline InGaO3(ZnO)5 films", Appl. Phys. Lett. (Applied Physics Letters), Sep. 13, 2004, vol. 85, No. 11, pp. 1993-1995.

\* cited by examiner

SEMICONDUCTOR DEVICE WITH VOLATILE AND NON-VOLATILE MEMORIES TO RETAIN DATA DURING POWER INTERRUPTION

BACKGROUND OF THE INVENTION

1. Field of the Invention

The present invention relates to a semiconductor device and particularly to a semiconductor device capable of retaining data even when the supply of power is stopped and a method for driving the semiconductor device.

2. Description of the Related Art

The increase in operating frequency and miniaturization of elements have been researched and developed to improve performance and reduce power consumption of semiconductor devices such as micro processing units (MPUs). On the other hand, power consumption of semiconductor devices due to leakage power caused by miniaturization of elements has been steadily increased.

To deal with the problem of increased power consumption, recent attention has been focused on a technique of saving data in a non-volatile memory device and stopping the supply of power to circuits other than a circuit that needs to operate.

For example, Patent Document 1 discloses a structure in which magnetoresistive random access memory (MRAM) is used as a non-volatile memory element. In the structure disclosed in Patent Document 1, data is saved from a processor to a non-volatile memory device provided outside the processor before the supply of power is stopped, and the data saved in the non-volatile memory device is restored to the processor when the supply of power is resumed.

Patent Document 2 discloses a structure in which data is encrypted when the data is saved from a processor to a non-volatile memory device. In the structure disclosed in Patent Document 2, the processor is reset when data obtained by decrypting encrypted data is incorrect.

REFERENCE

Patent Document 1: PCT International Publication No. 2009/136442
Patent Document 2: Japanese Published Patent Application No. 2008-204459

SUMMARY OF THE INVENTION

In Patent Documents 1 and 2, the processor and the non-volatile memory device input and output data via a bus line.

It has been difficult to fabricate a processor and a non-volatile memory device on one chip because they are formed in different processes and have different operating voltages.

Because of the necessity of two devices of a processor and a non-volatile memory device, data security cannot be maintained without encryption of data saved from the processor to the non-volatile memory device.

To address the data security problem, data to be saved can be subjected to encryption as disclosed in Patent Document 2.

Meanwhile, when a processor and a non-volatile memory device are different chips, as the amount of saved data is increased, wiring delay due to parasitic resistance, parasitic capacitance, and the like of a bus line provided between the processor and the non-volatile memory device results in slower speed of data saving. Furthermore, as the amount of data to be restored is increased, wiring delay of the bus line reduces data reading speed when data is restored to the processor; thus, the processing speed of the processor is decreased.

Moreover, a volatile register and a non-volatile register may be used as registers in a processor so that data can be saved and restored at high speed in the processor.

However, when a volatile register and a non-volatile register are used as registers in a processor, false data might be stored in the non-volatile register or data stored in the non-volatile register might be lost. Such improper data storage or data loss degrades the data integrity of the non-volatile register during power interruption, which adversely affects the operation at the resumption of power supply.

In view of the above, an object of one embodiment of the present invention is to provide a semiconductor device capable of solving all of the following problems caused when a volatile register and a non-volatile register are used as registers in a processor, and a method for driving the semiconductor device. The problems to be solved are degradation of the integrity of data stored in the non-volatile register, loss of data security due to the processor and a non-volatile memory device that are provided apart from each other, and slow data processing speed due to wiring delay or the like caused by these devices provided apart from each other.

In one embodiment of the present invention, a volatile register and a non-volatile register are used as registers in a processor. When data maintained in the volatile register is stored in the non-volatile register before supply of power supply voltage is stopped, the data is compressed and encrypted by an encryption circuit and the resulting data is stored in a non-volatile memory device that is provided separately from the processor. Then, the data stored in the non-volatile register is compared with the compressed and encrypted data stored in the non-volatile memory device.

With the structure of one embodiment of the present invention, the volatile register and the non-volatile register can be fabricated on one chip through successive steps; data can be input and output between the volatile register and the non-volatile register in the processor; the amount of data saved in the non-volatile register is reduced by data compression and thus a smaller amount of data can be input and output through a bus line; and data stored in the non-volatile register can be verified against data that is encrypted and then decrypted.

One embodiment of the present invention is a semiconductor device including a processor including a volatile register and a non-volatile register; an encryption circuit compressing and encrypting first data stored in the non-volatile register to create second data; a non-volatile memory device storing the second data; and a control circuit comparing the first data and third data obtained by decryption of the second data, to verify whether the first data is correct or not.

One embodiment of the present invention is a semiconductor device including a processor including a volatile register and a non-volatile register; an encryption circuit compressing and encrypting first data stored in the non-volatile register to create second data; a non-volatile memory device that stores the second data and includes a memory element fabricated in a process different from a process of fabricating a memory element included in the non-volatile register; and a control circuit comparing the first data and third data obtained by decryption of the second data, to verify whether the first data is correct or not.

In the semiconductor device of one embodiment of the present invention, it is preferable that second data be input to and output from the encryption circuit, the control circuit, and the non-volatile memory device through a bus line.

In the semiconductor device of one embodiment of the present invention, the control circuit preferably includes a decryption circuit generating the third data by decrypting the second data, and a comparator circuit comparing the first data and the third data.

In the semiconductor device of one embodiment of the present invention, it is preferable that the memory element included in the non-volatile register store the first data by holding charge with a transistor including an oxide semiconductor layer.

One embodiment of the present invention is a method for driving any of the above semiconductor devices through the following steps: saving the first data to the non-volatile register; copying the first data to the encryption circuit; compressing and encrypting the copied first data to create the second data; transferring the second data to the non-volatile memory device; and stopping supply of a power supply voltage to the processor.

One embodiment of the present invention is a method for driving any of the above semiconductor devices through the following steps: resuming supply of a power supply voltage to the processor; transferring the second data to the control circuit; decrypting the second data to create the third data; copying the first data stored in the non-volatile register to the control circuit; performing a comparison between the first data and the third data; and reading the first data stored in the non-volatile register and transmitting the first data to the volatile register to resume processing when the comparison shows that the first data and the third data are the same, or discarding the first data stored in the non-volatile register when the comparison shows that the first data and the third data are not the same.

In one embodiment of the present invention, the integrity of data stored in the non-volatile register can be ensured by verification of the data stored in the non-volatile register against data obtained by compression and subsequent decoding. In addition, in one embodiment of the present invention, data input to and output from the bus line is encrypted, so that the integrity of data can be improved even when the processor and the non-volatile memory device are provided apart from each other. Further, in one embodiment of the present invention, data input to and output from the bus line is compressed, so that data processing speed depending on wiring delay or the like can be improved.

BRIEF DESCRIPTION OF THE DRAWINGS

In the accompanying drawings.

DETAILED DESCRIPTION OF THE INVENTION

Figure 1:
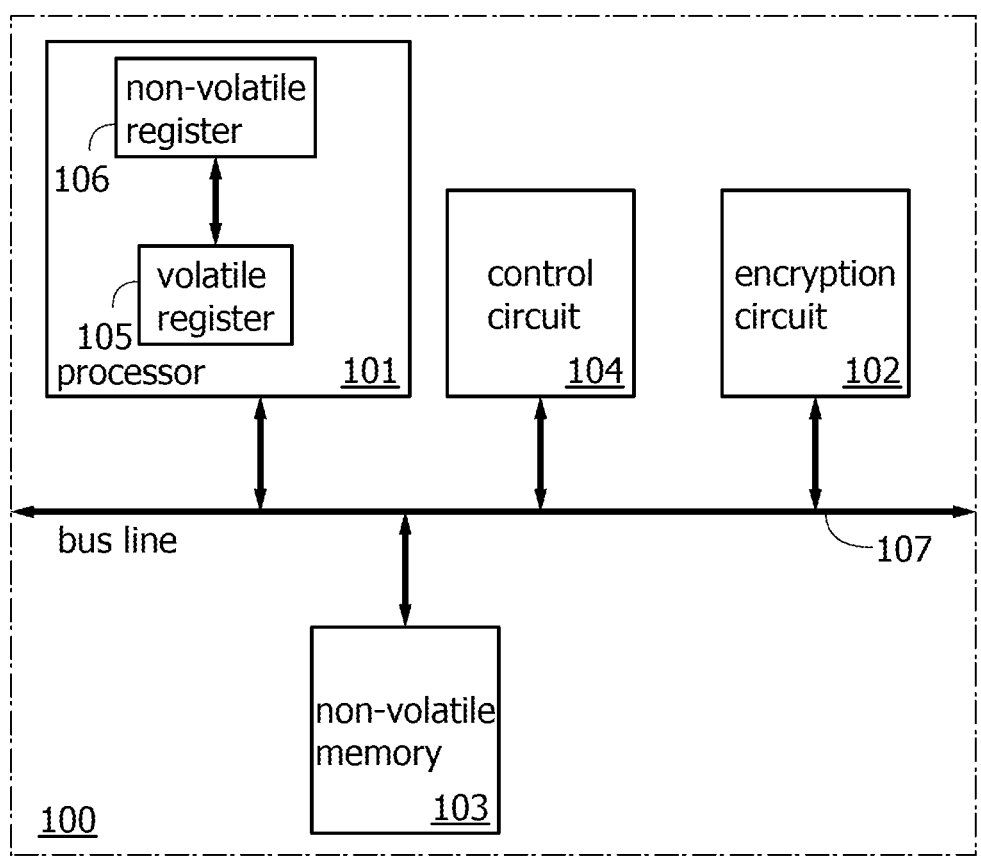
FIG. 1 is a block diagram illustrating the structure of a semiconductor device.

Embodiments will be hereinafter described with reference to the accompanying drawings. Note that the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments. Note that in structures of the present invention described below, reference numerals denoting the same portions are used in common in different drawings.

In the drawings, the size, the thickness of layers, or regions may be exaggerated for clarity in some cases; therefore, embodiments of the present invention are not limited to such a scale. Note that drawings are schematic views of ideal examples, and the embodiments of the present invention are not limited to the shape or the value illustrated in the drawings. For example, variation in signal, voltage, or current due to noise or a difference in timing can be included.

In this specification and the like, a transistor is an element having at least three terminals: a gate, a drain, and a source. The transistor has a channel region between the drain (a drain terminal, a drain region, or a drain electrode) and the source (a source terminal, a source region, or a source electrode), and current can flow through the drain, the channel region, and the source.

Here, since the source and the drain of the transistor may change depending on a structure, operating conditions, and the like of the transistor, it is difficult to define which is a source or a drain. Thus, it is possible that a portion functioning as the source and a portion functioning as the drain are not called a source and a drain, and that one of the source and the drain is referred to as a first electrode and the other is referred to as a second electrode.

Note that in this specification, ordinal numbers such as "first", "second", and "third" are used to avoid confusion among components, and thus do not limit the number of the components.

In this specification, the expression "A and B are connected" means the case where A and B are electrically connected to each other in addition to the case where A and B are directly connected to each other. Here, the expression "A and B are electrically connected" means the case where electric signals can be transmitted and received between A and B when an object having any electric action exists between A and B.

In this specification, terms for explaining arrangement, such as "over" and "under", are used for convenience to describe the positional relation between components with reference to drawings. Further, the positional relation between components is changed as appropriate in accordance with a direction in which each component is described. Thus, there is no limitation on terms used in this specification, and description can be made as appropriate depending on the situation.

Note that the layout of circuit blocks in a drawing specifies the positional relation for description. Thus, even when a drawing shows that different functions are achieved in different circuit blocks, an actual circuit block may be configured so that the different functions are achieved in the same circuit block. In addition, the function of each circuit block in a drawing is specified for description. Thus, even when one circuit block is illustrated, an actual circuit or region may be configured so that processing which is shown as being performed in the one circuit block is performed in a plurality of circuit blocks.

In this specification, voltage often refers to a potential difference between a given potential and a reference potential (e.g., a ground potential). Accordingly, voltage, potential, and potential difference can also be referred to as potential, voltage, and voltage difference, respectively. Note that voltage refers to a difference between potentials of two points, and a potential refers to electrostatic energy (electric potential energy) of a unit charge at a given point in an electrostatic field.

In this specification, the term "parallel" indicates that the angle formed between two straight lines ranges from −10° to 10°, and accordingly also includes the case where the angle ranges from −5° to 5°. In addition, the term "perpendicular" indicates that the angle formed between two straight lines ranges from 80° to 100°, and accordingly also includes the case where the angle ranges from 85° to 95°.

In this specification, trigonal and rhombohedral crystal systems are included in a hexagonal crystal system.

(Embodiment 1)

In this embodiment, a circuit configuration and operation of a memory cell included in a semiconductor device of one embodiment of the disclosed invention will be described with reference to FIG. 1.

Note that a semiconductor device refers to a device including a semiconductor element. A semiconductor device includes an encryption circuit, a non-volatile memory device, and a control circuit in addition to a processor.

FIG. 1 is a block diagram of a semiconductor device. A semiconductor device 100 illustrated in FIG. 1 includes a processor 101, an encryption circuit 102, a non-volatile memory device (referred to as non-volatile memory in drawings) 103, and a control circuit 104.

The processor 101 includes both of a nonvolatile register and a volatile register. Specifically, the processor 101 includes a volatile register 105 and a non-volatile register 106.

The volatile register 105 and the non-volatile register 106 each perform data storage associated with data processing. Data storage in the processor 101 is performed by the volatile register 105 while power is supplied, and is performed by the non-volatile register 106 while the supply of power is stopped.

The volatile register 105 is preferably composed of elements that are stacked by an element included in the non-volatile register 106. Specifically, the volatile register 105 can use silicon-based semiconductor elements (e.g., capacitor and transistor).

The non-volatile register 106 preferably includes an element having a non-volatile memory element that is stacked on the element included in the volatile register 105. Specific examples of the non-volatile memory element that can be used in the non-volatile register 106 are ferroelectric random access memory (FeRAM), magnetoresistive random access memory (MRAM), phase-change memory (PRAM), resistive random access memory (ReRAM) utilizing change in electric-field induced colossal electroresistance, and a non-volatile memory element using a transistor including an oxide semiconductor layer.

The encryption circuit 102 compresses and encrypts data stored in the non-volatile register 106 (hereinafter referred to as first data). The first data is read from the non-volatile register 106 under the control of the control circuit 104 and copied to the encryption circuit 102. Data that is compressed and encrypted by the encryption circuit 102 (hereinafter referred to as second data) is read from the encryption circuit 102 under the control of the control circuit 104, and stored in the non-volatile memory device 103. Note that the second data can be read and transmitted to the control circuit 104 under the control of the control circuit 104 and converted into data decrypted by a decryption circuit included in the control circuit 104 (hereinafter referred to as third data).

Note that the second data is obtained by compressing and encrypting the first data; thus, the amount of the second data is smaller than that of the first data. The encryption circuit 102 can employ a symmetric-key algorithm, for example. Examples of a symmetric-key algorithm include Data Encryption Standard (DES) and Advanced Encryption Standard (AES). Note that the same cryptographic keys can be used for both encryption by the encryption circuit 102 and decryption by the decryption circuit included in the control circuit 104.

Alternatively, the encryption circuit 102 can be an error detection circuit. In this case, the second data is an error-detecting code (cyclic redundancy check: CRC), and the decryption circuit in the control circuit 104 can be omitted, resulting in omission of decoding of the second data to the third data. Here, the first data that is compared with the error-detecting code, which is the second data, can be converted into an error-detecting code like the second data for verification. An error-detecting code can be a checksum.

The non-volatile memory device 103 is a circuit capable of storing the second data even while the supply of power is stopped.

Specifically, a memory element in the non-volatile memory device 103 can be flash memory. Other examples of the memory element that can be used in the non-volatile memory device 103 are ferroelectric random access memory (FeRAM), magnetoresistive random access memory (MRAM), phase-change memory (PRAM), resistive random access memory (ReRAM) utilizing change in electric-field induced colossal electroresistance, and a non-volatile memory element using a transistor including an oxide semiconductor layer.

The control circuit 104 controls the processor 101, the encryption circuit 102, and the non-volatile memory device 103 in response to stop or restart of power supply. Specifically, the control circuit 104 controls these circuits so that the following operations involved in stop of power supply are performed, for example: saving of the first data from the volatile register 105 to the non-volatile register 106; copy of the first data to the encryption circuit 102; storage of the second data in the non-volatile memory device 103; decryption of the second data; and comparison between the third data and the first data.

In the semiconductor device 100 described above, the first data stored in the non-volatile register 106 is copied to the encryption circuit 102 via a bus line 107 under the control of the control circuit 104. Then, in the semiconductor device 100, the copied first data is converted into the second data, which is compressed and encrypted by the encryption circuit 102, and after that, the second data obtained by compression and encryption is stored in the non-volatile memory device 103 under the control of the control circuit 104. Thus, even when the supply of power to the processor 101 and the non-volatile memory device 103 is stopped, the first data can be stored in the non-volatile register 106 and the second data can be stored in the non-volatile memory device 103.

After the supply of power to the processor 101 and the non-volatile memory device 103 is resumed in the semiconductor device 100, the second data stored in the non-volatile memory device 103 is converted into the third data, which is decrypted by the control circuit 104. Then, in the semiconductor device 100, the decrypted third data is compared with the first data, which is copied under the control of the control circuit 104, and whether the first data stored in the non-volatile register 106 is maintained correctly during power interruption can be judged by the comparison result.

With the structure of this embodiment, the volatile register 105 and the non-volatile register 106 can be mounted on one chip through successive steps. Fabricating these registers as one chip enables data to be transmitted and received therebetween without passing through the bus line 107 such as a data bus and an address bus. As a result, adverse effects of wiring delay due to parasitic resistance, parasitic capacitance, and the like of the bus line 107 can be eliminated.

Moreover, integration of the volatile register 105 and the non-volatile register 106 on one chip increases the speed of data saving from the volatile register 105 to the non-volatile register 106 and data restoration from the non-volatile register 106 to the volatile register 105.

In addition, in the structure of this embodiment, data transmitted and received between the encryption circuit 102 and the non-volatile memory device 103 is the encrypted second data, so that the data security can be enhanced even when these two devices are positioned apart from each other. Furthermore, in the structure of this embodiment, data saved from the encryption circuit 102 to the non-volatile memory device 103 is compressed to be transmitted and received. Accordingly, adverse effects of wiring delay due to parasitic resistance, parasitic capacitance, and the like of the bus line 107 can be reduced, and data processing speed can be increased.

In the structure of this embodiment, the second data stored in the non-volatile memory device 103 is decrypted by the control circuit 104 to be the third data after the supply of power is resumed, and the third data and the first data stored in the non-volatile register 106 are compared for verification. Thus, the integrity of the first data can be ensured.

Next, operations of stopping and restarting the supply of power to the semiconductor device 100 in FIG. 1 will be described with reference to FIGS. 2 to 7.

Figure 2:
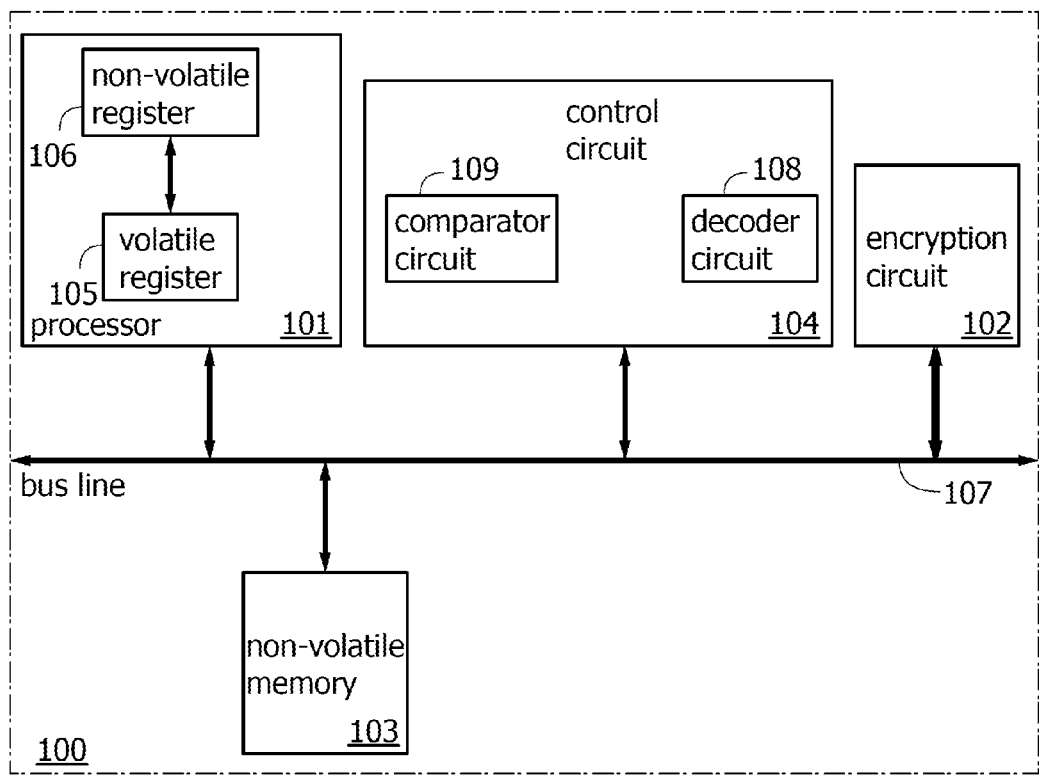
FIG. 2 is a block diagram illustrating the structure of a semiconductor device.

FIG. 2 is a block diagram in which a decryption circuit (referred to as decoder circuit in drawings) 108 and a comparator circuit 109 are added in the control circuit 104 in the block diagram of FIG. 1.

The decryption circuit 108 illustrated in FIG. 2 decrypts the second data stored in the non-volatile memory device 103. Specifically, the decryption circuit 108 changes the second data into the decrypted third data.

The comparator circuit 109 in FIG. 2 compares the third data with the first data that is copied from the non-volatile register 106 to verify whether the first data is maintained correctly during power interruption.

Figure 3:
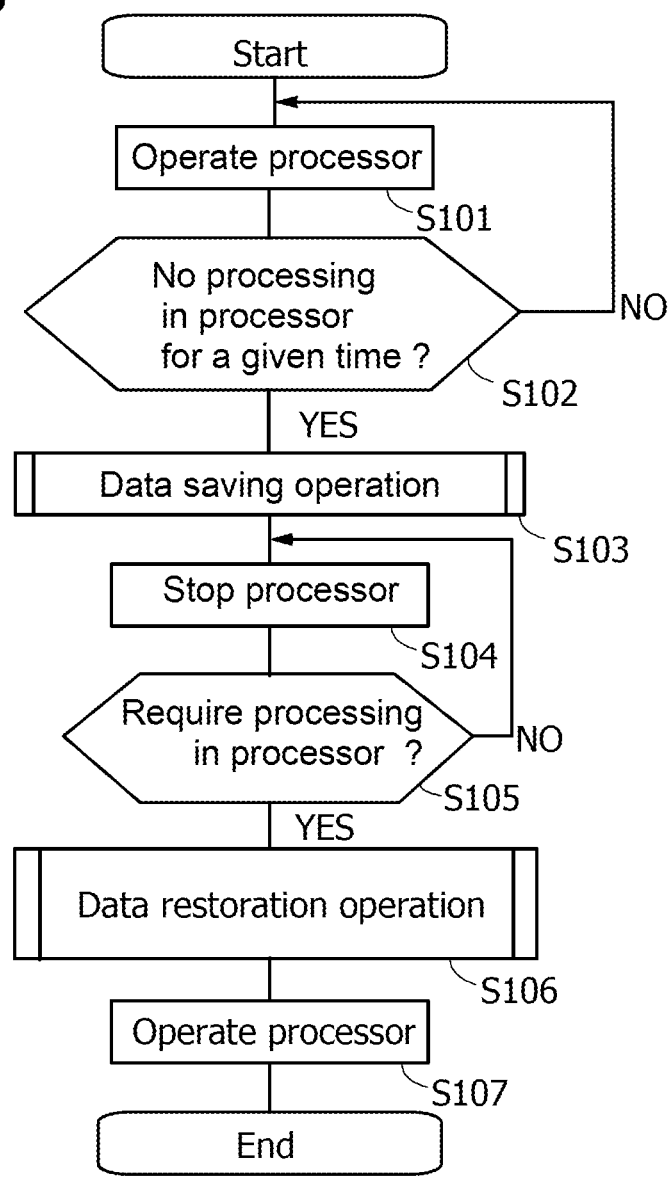
FIG. 3 is a flow chart showing the operation of a semiconductor device.

FIG. 3 is a flow chart showing data saving and restoration operations performed simultaneously with stop and restart of power supply to the semiconductor device 100 in FIG. 2.

First, the processor 101 operates in Step S101. In the state where the processor operates, data input to the processor 101 is processed; this state corresponds to normal operation. At this time, power is continuously supplied, and data obtained by arithmetic processing is temporarily stored in the volatile register 105.

In Step S102, whether no processing is performed in the processor 101 for a given time is judged. The procedure proceeds to Step S103 when no processing is performed in the processor 101 for a given time. The procedure returns to Step S101 when processing is performed in the processor 101. Note that the expression "no processing is performed in the processor for a given time" means that data to be processed is not input to the processor 101 within a given time and thus the processor 101 is idle. Further, the term "a given time" is a period whose length is set as appropriate in consideration of the performance of the processor 101, for example.

In Step S103, data saving operation is performed so that the data in the volatile register 105 is written into the non-volatile register 106 and the supply of power is stopped. The data saving operation in Step S103 will be described in detail with reference to FIGS. 4 and 5.

In Step S104, the processor 101 is stopped. In the state where the processor stops, the supply of power to the processor 101 is stopped, and data is not input to or output from the processor 101. In this state, data in the volatile register 105 is lost and data in the non-volatile register 106 is retained.

In Step S105, whether processing in the processor 101 is required is judged. The procedure proceeds to Step S106 when processing in the processor 101 is required. The procedure returns to Step S104 when processing in the processor 101 is not required. Note that whether processing in the processor 101 is required may be judged at predetermined intervals by using a timer, or may be judged by the control circuit 104 every time an input is given from an external device.

In Step S106, data restoration operation is performed so that the supply of power is restarted and the data in the non-volatile register 106 is read and transmitted to the volatile register 105. The data restoration operation in Step S106 will be described in detail with reference to FIGS. 6 and 7.

In Step S107, the processor 101 operates as in Step S101. That is, power is continuously supplied, and data obtained by arithmetic processing is temporarily stored in the volatile register 105.

As described above, according to the flow chart in FIG. 3, the supply of power to the semiconductor device 100 in FIG. 2 can be stopped and restarted as appropriate when the processor 101 needs to be operated. In addition, data saving and restoration operations can be implemented simultaneously with stop and restart of power supply to the semiconductor device 100, thereby preventing data loss before and after stop and restart of power supply.

Figure 4:
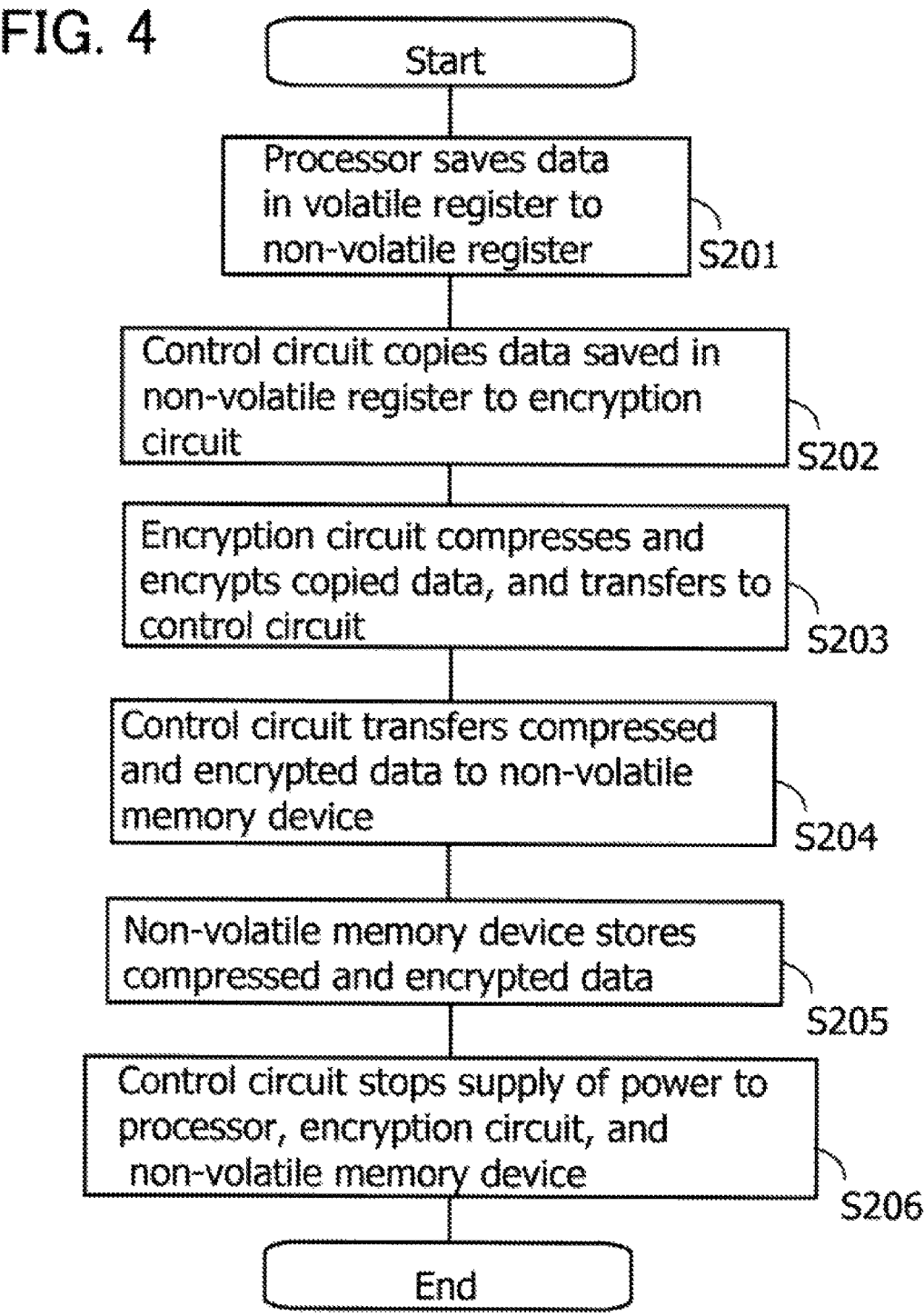
FIG. 4 is a flow chart showing the operation of a semiconductor device.
Figure 5:
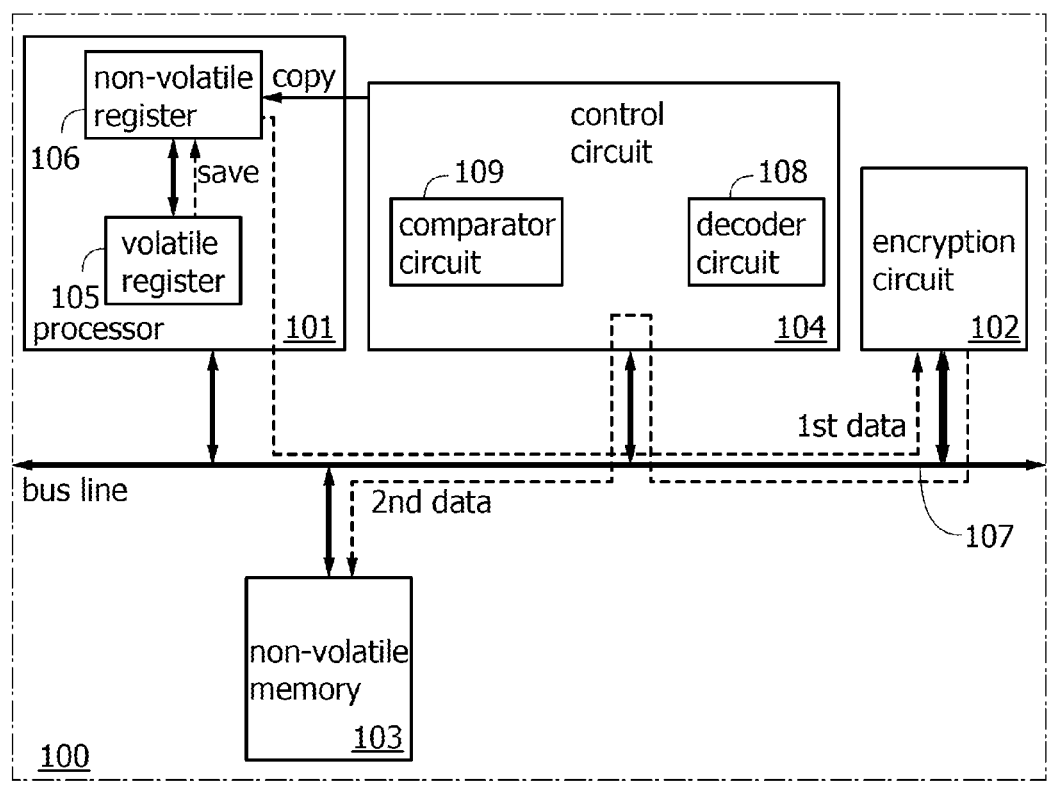
FIG. 5 is a block diagram illustrating the structure of a semiconductor device.

FIG. 4 is a flow chart of the data saving operation corresponding to Step S103 in the flow chart of FIG. 3. FIG. 5 is a block diagram in which the operations shown in the flow chart of FIG. 4 are added to the block diagram of the semiconductor device 100 in FIG. 2.

First, in Step S201, the processor 101 makes data stored in the volatile register 105 (first data) to be saved and stored in the non-volatile register 106.

In Step S202, the data (first data) stored in the non-volatile register 106 is copied to the encryption circuit 102 under the control of the control circuit 104.

In Step S203, the encryption circuit 102 compresses and encrypts the data (first data) to create compressed and encrypted data (second data). The compressed and encrypted data (second data) is temporarily transferred to the control circuit 104 under the control of the control circuit 104.

In Step S204, the control circuit 104 transmits the compressed and encrypted data (second data), which is transferred from the encryption circuit 102, to the non-volatile memory device 103.

In Step S205, the non-volatile memory device 103 stores the compressed and encrypted data (second data), which is transferred from the control circuit 104.

In Step S206, the supply of power to the processor 101, the encryption circuit 102, and the non-volatile memory device 103 is stopped under the control of the control circuit 104.

The block diagram in FIG. 5 illustrates input and output of the first data and the second data (indicated as 1st data and 2nd data in FIG. 5) in the semiconductor device that are performed as above according to the flow chart of FIG. 4.

Figure 6:
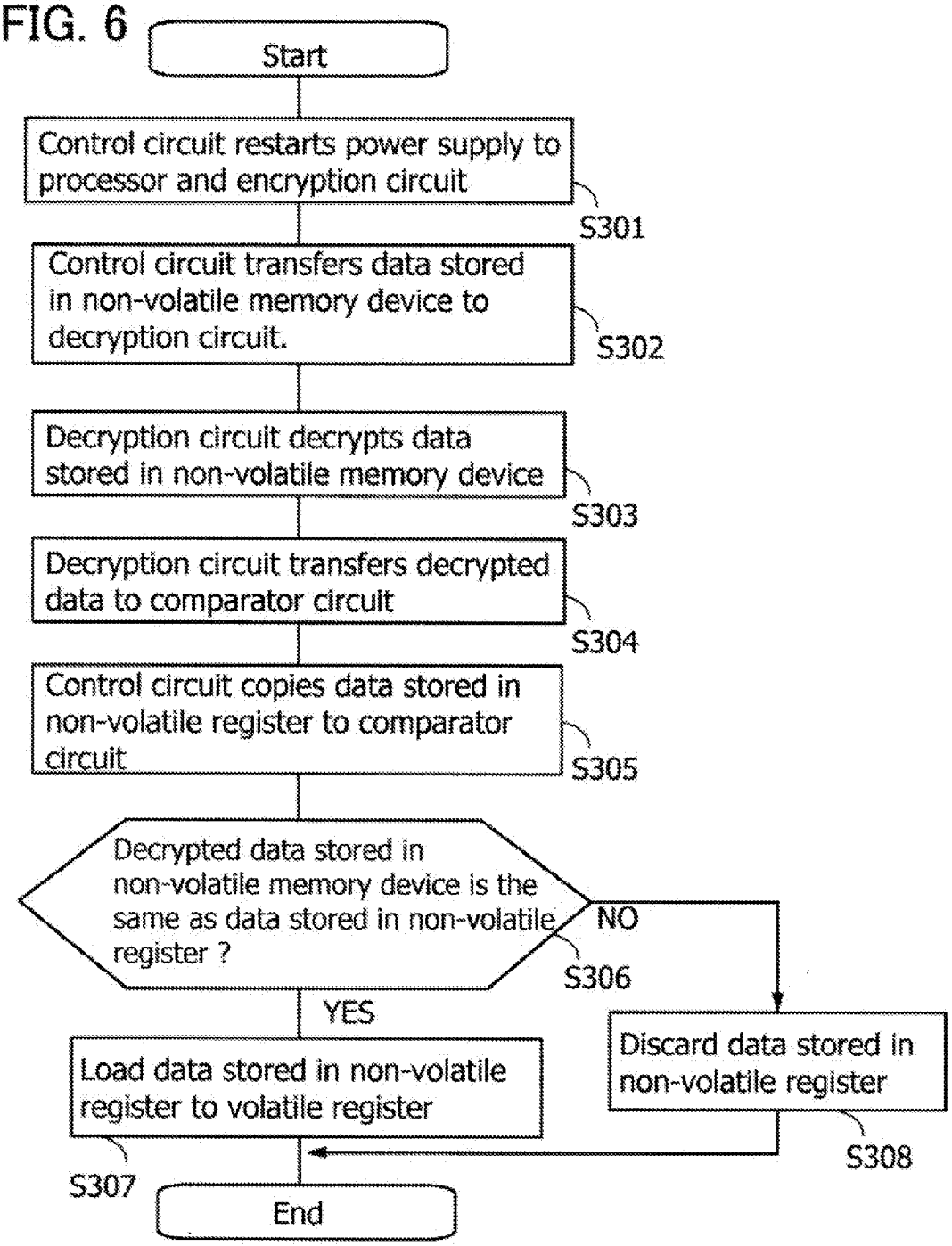
FIG. 6 is a flow chart showing the operation of a semiconductor device.
Figure 7:
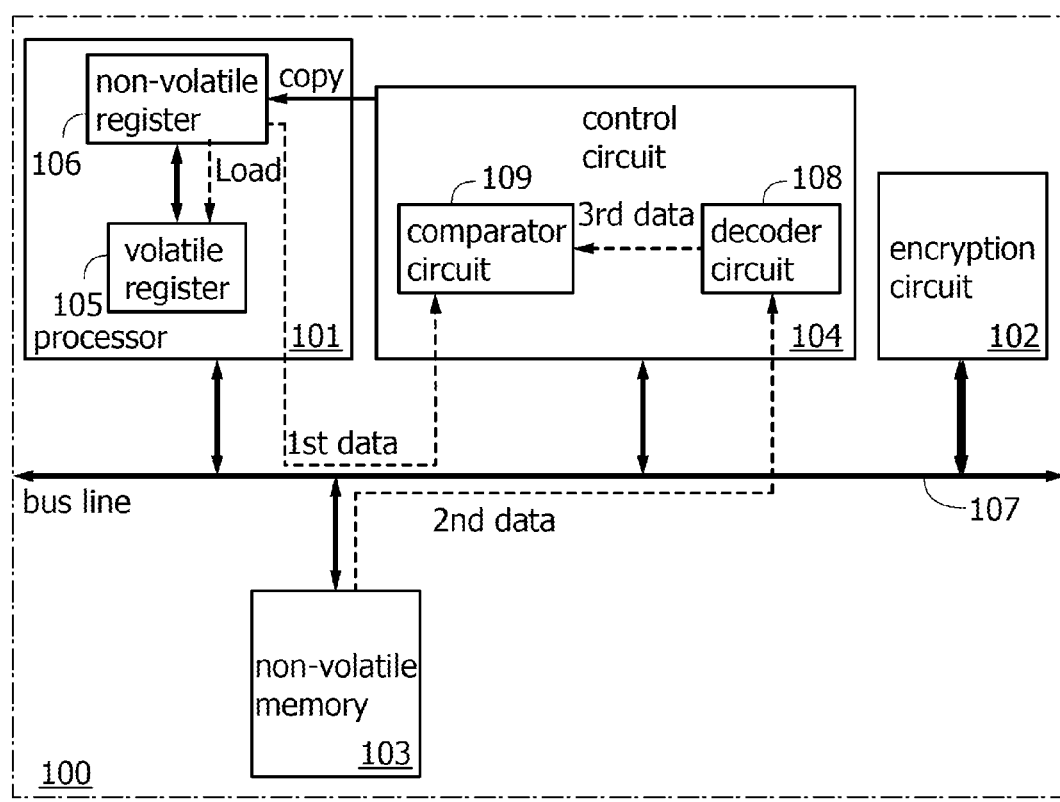
FIG. 7 is a block diagram illustrating the structure of a semiconductor device.

FIG. 6 is a flow chart of the data restoration operation corresponding to Step S106 in the flow chart of FIG. 3. FIG. 7 is a block diagram in which the operations shown in the flow chart of FIG. 6 are added to the block diagram of the semiconductor device 100 in FIG. 2.

First, in Step S301, the supply of power to the processor 101, the encryption circuit 102, and the non-volatile memory device 103 is restarted under the control of the control circuit 104.

In Step S302, the data (second data) stored in the non-volatile memory device 103 is transferred to the decryption circuit 108 under the control of the control circuit 104.

In Step S303, the decryption circuit 108 decrypts the data (second data), thereby obtaining decrypted data (third data).

In Step S304, the decrypted data (third data) is transferred to the comparator circuit 109 under the control of the control circuit 104.

In Step S305, the data (first data) stored in the non-volatile register 106 is copied to the comparator circuit 109 under the control of the control circuit 104.

In Step S306, whether the data (third data) obtained by decrypting the data stored in the non-volatile memory device 103 during power interruption is the same as the data (first data) stored in the non-volatile register 106 during power interruption is judged. The procedure proceeds to Step S307 when the data (third data) obtained by decrypting the data stored in the non-volatile memory device 103 is the same as the data (first data) stored in the non-volatile register 106. The procedure proceeds to Step S308 when they are not the same data.

In the case where the third data is the same as the first data, the first data is regarded as correct data and used in subsequent process in Step S307. Specifically, the processor 101 reads (loads) the first data to the volatile register 105 and resumes data processing.

In the case where the third data is not the same as the first data, the first data is regarded as incorrect data and thus is not used in subsequent process in Step S308. Specifically, the processor 101 discards the first data and reads new data from another device to the volatile register 105 to resume processing.

The block diagram in FIG. 7 illustrates input and output of the first data, the second data, and the third data (indicated as 1st data, 2nd data, and 3rd data in FIG. 7) in the semiconductor device that are performed as above according to the flow chart of FIG. 6.

With the structure shown in this embodiment, it is possible to provide a semiconductor device that obtains data integrity and security without reduction in data processing speed due to wiring delay or the like. It is also possible to provide a method for driving the semiconductor device.

This embodiment can be implemented in appropriate combination with any of the other embodiments.

(Embodiment 2)

A register having a non-volatile part and a volatile part will be described with reference to FIG. 8.

Figure 8:
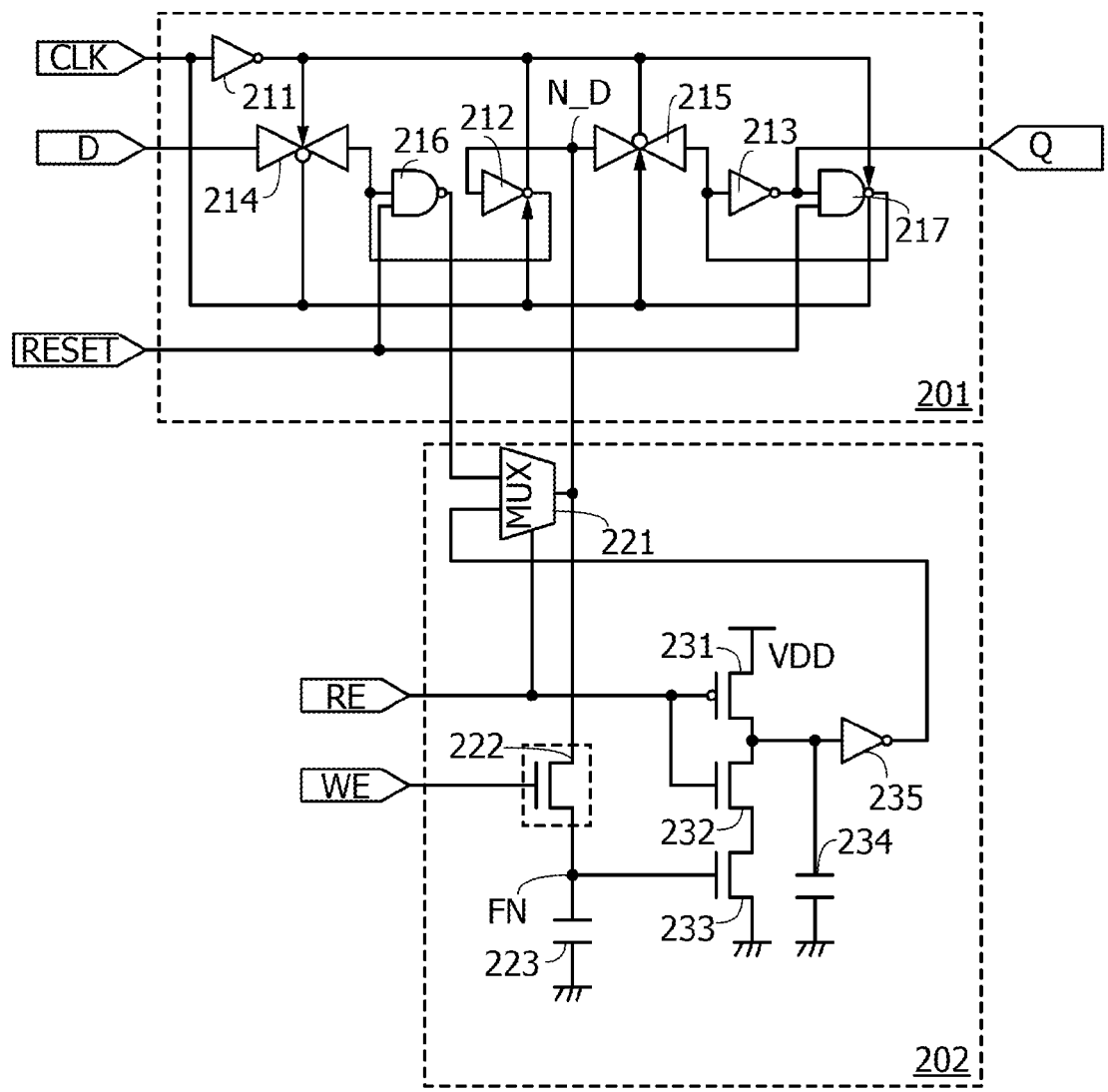
FIG. 8 is a circuit diagram illustrating a structure example of a register including a volatile register and a non-volatile register.

FIG. 8 is a circuit diagram of a register with 1-bit storage capacity having a non-volatile part and a volatile part. The register illustrated in FIG. 8 includes a memory circuit 201 and a memory circuit 202. The memory circuit 201 is a 1-bit volatile register, and the memory circuit 202 is a 1-bit non-volatile register. Note that the memory circuits 201 and 202 can include another element such as a diode, a resistor, or an inductor as needed.

The memory circuit 201 includes inverters 211 to 213, transmission gates 214 and 215, NAND 216, and NAND 217. The memory circuit 201 stores data while power is supplied. The memory circuit 201 writes the stored data to the memory circuit 202 in a period just before the supply of power is stopped. Then, the data written into the memory circuit 202 is read out in a period just after the supply of power is resumed, and the read data is used as data of the memory circuit 201.

The memory circuit 202 includes a selector 221, a transistor 222, a capacitor 223, transistors 231 to 233, a capacitor 234, and an inverter 235. The memory circuit 202 is capable of storing data while the supply of power is stopped.

The inverter 211 has a function of generating a clock signal CLKb that is obtained by inverting the polarity of the potential of a clock signal CLK. In the transmission gates 214 and 215, the inverter 212, and the NAND 217, whether to output a signal is selected in accordance with the clock signals CLK and CLKb.

The transmission gate 214 has a function of supplying a data signal D supplied to its input terminal to a first input terminal of the NAND 216 when the clock signal CLK is low and the clock signal CLKb is high. Moreover, the transmission gate 214 has high impedance and stops the supply of the data signal D to the first input terminal of the NAND 216 when the clock signal CLK is high and the clock signal CLKb is low.

The NAND 216 is a two-input NAND. The first input terminal of the NAND 216 is supplied with the data signal D output from the transmission gate 214 or a signal output from the inverter 212. A second input terminal of the NAND 216 is supplied with a control signal RESET. The NAND 216 has a function of outputting a signal to a first input terminal of the selector 221 in accordance with the signals input to the first and second input terminals.

The selector 221 is a two-input multiplexer. The first input terminal of the selector 221 is supplied with a signal output from the NAND 216. A second input terminal of the selector 221 is supplied with a signal output from the inverter 235. The selector 221 has a function of outputting a signal input to its first input terminal to an input terminal of the inverter 212, an input terminal of the transmission gate 215, and a first terminal of the transistor 222 when the control signal RE is low. Moreover, the selector 221 has a function of outputting a signal input to its second input terminal to the input terminal of the inverter 212, the input terminal of the transmission gate 215, and the first terminal of the transistor 222 when the control signal RE is high.

The inverter 212 has a function of inverting the polarity of the potential of a signal supplied to its input terminal and outputting the inverted signal when the clock signal CLK is high and the clock signal CLKb is low. The output signal is supplied to the second input terminal of the NAND 216. Further, the inverter 212 has high impedance and stops the supply of a signal to the second input terminal of the NAND 216 when the clock signal CLK is low and the clock signal CLKb is high.

The inverter 213 has a function of inverting the potentials of signals supplied from output terminals of the transmission gate 215 and the NAND 217 and outputting the inverted signals as signals Q. The signal Q output from the inverter 213 is supplied to a first input terminal of the NAND 217.

The NAND 217 is a two-input NAND. The first input terminal of the NAND 217 is supplied with a signal output from the inverter 213. A second input terminal of the NAND 217 is supplied with the control signal RESET. The NAND 217 has a function of outputting a signal to an input terminal of the inverter 213 in accordance with the signals input to the first and second input terminals.

The on/off state of the transistor 222 is controlled in accordance with the potential of a control signal WE. The transistor 222 has a function of controlling the supply of a potential of a node N_D in the memory circuit 201 to a floating node FN. The potential of the node N_D corresponds to data 1 or 0 that the memory circuit 201 has.

The floating node FN included in the memory circuit 202 is a data storage portion. The potential of the floating node FN is maintained by the transistor 222 and the capacitor 223. The on/off state of the transistor 233 is controlled in response to the potential of the floating node FN.

To improve charge retention characteristics of the memory circuit 202, the off-state current of the transistor 222 is preferably as low as possible. Low off-state current of the transistor 222 results in a smaller amount of charge leaking from the floating node FN. An example of a transistor with lower leakage current than a single crystal silicon transistor is a transistor using a thin film of an oxide semiconductor.

Among oxide semiconductors, in particular, a highly purified oxide semiconductor (purified OS) obtained by reduction of impurities such as moisture or hydrogen serving as electron donors (donors) and reduction of oxygen vacancies is an i-type (intrinsic) semiconductor or a substantially i-type semiconductor. For this reason, a transistor having a channel formation region in a highly purified oxide semiconductor layer has an extremely small amount of off-state current and high reliability, and thus is suitable for the transistor 222.

The on/off states of the transistors 231 and 232 are controlled with the control signal RE. The transistors 231 and 232 have a function of controlling charge and discharge of the capacitor 234 using a potential VDD. When the control signal RE is low, the transistor 231 is turned on and the transistor 232 is turned off, so that the capacitor 234 is charged with the potential VDD.

On the other hand, when the control signal RE is high, the transistor 231 is turned off and the transistor 232 is turned on. At this time, the charge charged in the capacitor 234 is discharged when the transistor 233 is on, whereas it is not discharged when the transistor 233 is off. Depending on whether the discharge occurs, data stored at the floating node FN in the memory circuit 202 is converted into a potential of the capacitor 234 to be data corresponding to 1 or 0. The potential of the capacitor 234 is output to the second input terminal of the selector 221 through the inverter 235.

As above, in a semiconductor device including the register illustrated in FIG. 8, a circuit can be composed of the transistor 222 using an oxide semiconductor and other transistors using silicon. The transistor 222 using an oxide semiconductor and the transistors using silicon can be stacked; thus, in the semiconductor device including the register in FIG. 8, these transistors can be fabricated in successive steps and formed on one chip.

In a semiconductor device serving as a non-volatile register using the transistor 222, which contains an oxide semiconductor and has extremely low off-state current, power consumed by data saving and restoration operations (i.e., overhead) can be lower than that of a non-volatile register using magnetoresistive random access memory (MRAM). While current necessary for data writing is 50 µA to 500 µA in MRAM, the non-volatile register in FIG. 8, which uses the transistor containing an oxide semiconductor, only requires about 1/100 of the current used in MRAM because data is written with supply of charge to the capacitor. Accordingly, break-even time (BET) in the semiconductor device including the register in FIG. 8 can be shorter than that in a register using MRAM. Note that BET is a power-off period in which overhead is equal to power cut by power interruption.

Figure 9:
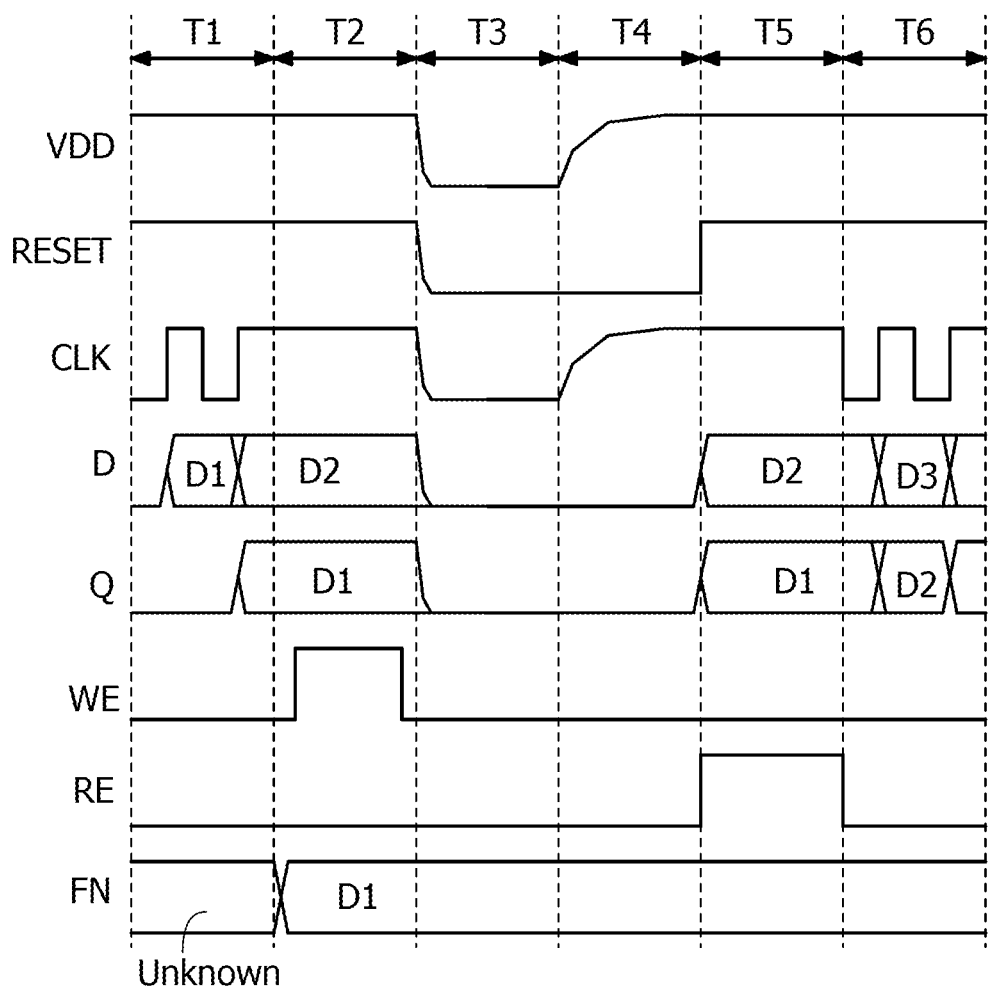
FIG. 9 is a timing chart of a register including a volatile register and a non-volatile register.

Next, FIG. 9 shows a timing chart of the register illustrated in FIG. 8.

In normal operation (T1), an output signal of the NAND 216 is selected as an output signal of the selector 221 by a low-level control signal RE. At this time, the memory circuit 201 can function as a normal D flip-flop.

In data writing into the memory circuit 202 (T2), the clock signal CLK is kept high so that data (D2) of the memory circuit 201 is determined, and the control signal WE is set high. At this time, the floating node FN in the memory circuit 202 has a potential corresponding to the data of the memory circuit 201, so that the data (D1) stored in the memory circuit 201 is maintained in the memory circuit 202.

In a power-off period (T3), the potential (data) of the floating node FN is maintained by a low-level control signal WE. At this time, the supply of power to the memory circuit 202 is stopped, and each of the control signals is set low.

In power recovery (T4), the supply of power is resumed, and the control signal RE is set low to charge the capacitor 234. At this time, the clock signal CLK is kept high.

In data reading from the memory circuit 202 (T5), the control signal RE is set high, and whether charge in the capacitor 234 is discharged in accordance with the potential of the floating node FN is determined. At this time, by making the control signal RE high, an output signal of the inverter 235 is selected as an output signal of the selector 221, and the data stored in the memory circuit 202 is read and transmitted to the memory circuit 201. Moreover, the clock signal CLK is kept high so that the data read from the memory circuit 202 is held in the memory circuit 201.

Then, in normal operation (T6), input of the clock signal CLK and data (D3) is resumed.

As above, in the semiconductor device including the register described using FIGS. 8 and 9, the memory circuit 201 serving as a volatile register can operate as a D flip-flop in normal operation. Thus, even with the addition of the memory circuit 202 serving as a non-volatile register, the register can operate at high speed in normal operation without being adversely affected by the oxide semiconductor transistor that limits the operating speed.

In the semiconductor device including the register described using FIGS. 8 and 9, the operating mode (on/off state) of the transistor 233 is selected in accordance with the potential held at the floating node FN in the memory circuit 202, and data 0 or 1 is read out in response to the selected operating mode. Thus, the original data can be accurately read out even if the amount of charge stored at the floating node FN fluctuates to some degree during the power-off period (T3).

This embodiment can be implemented in appropriate combination with any of the other embodiments.

(Embodiment 3)

This embodiment will explain an oxide semiconductor layer that can be used for a semiconductor layer of the transistor with low off-state current described in Embodiment 2.

An oxide semiconductor used for a channel formation region in the semiconductor layer of the transistor preferably contains at least indium (In) or zinc (Zn). In particular, the oxide semiconductor preferably contains both In and Zn. The oxide semiconductor preferably contains a stabilizer that is strongly bonded to oxygen, in addition to In and Zn. The oxide semiconductor preferably contains at least one of gallium (Ga), tin (Sn), zirconium (Zr), hafnium (Hf), and aluminum (Al) as the stabilizer.

As another stabilizer, the oxide semiconductor may contain one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

As the oxide semiconductor used for the semiconductor layer of the transistor, any of the following can be used, for example: indium oxide, tin oxide, zinc oxide, In—Zn-based oxide, Sn—Zn-based oxide, Al—Zn-based oxide, Zn—Mg-based oxide, Sn—Mg-based oxide, In—Mg-based oxide, In—Ga-based oxide, In—Ga—Zn-based oxide (also referred to as IGZO), In—Al—Zn-based oxide, In—Sn—Zn-based oxide, Sn—Ga—Zn-based oxide, Al—Ga—Zn-based oxide, Sn—Al—Zn-based oxide, In—Hf—Zn-based oxide, In—Zr—Zn-based oxide, In—Ti—Zn-based oxide, In—Sc—Zn-based oxide, In—Y—Zn-based oxide, In—La—Zn-based oxide, In—Ce—Zn-based oxide, In—Pr—Zn-based oxide, In—Nd—Zn-based oxide, In—Sm—Zn-based oxide, In—Eu—Zn-based oxide, In—Gd—Zn-based oxide, In—Tb—Zn-based oxide, In—Dy—Zn-based oxide, In—Ho—Zn-based oxide, In—Er—Zn-based oxide, In—Tm—Zn-based oxide, In—Yb—Zn-based oxide, In—Lu—Zn-based oxide, In—Sn—Ga—Zn-based oxide, In—Hf—Ga—Zn-based oxide, In—Al—Ga—Zn-based oxide, In—Sn—Al—Zn-based oxide, In—Sn—Hf—Zn-based oxide, and In—Hf—Al—Zn-based oxide.

For example, an In—Ga—Zn-based oxide with an atomic ratio of In:Ga:Zn=1:1:1, 3:1:2, or 2:1:3 or an oxide with an atomic ratio close to the above atomic ratios can be used.

If an oxide semiconductor film forming the semiconductor layer contains a large amount of hydrogen, the hydrogen and the oxide semiconductor are bonded to each other, so that part of the hydrogen serves as a donor and causes generation of an electron which is a carrier. As a result, the threshold voltage of the transistor shifts in the negative direction. It is therefore preferable that after formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is sometimes reduced by the dehydration treatment (dehydrogenation treatment). For that reason, it is preferable that oxygen be added to the oxide semiconductor film to fill oxygen vacancies increased by the dehydration treatment (dehydrogenation treatment). In this specification and the like, supplying oxygen to an oxide semiconductor film may be expressed as oxygen adding treatment or oxygen supplying treatment.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) oxide semiconductor film or a substantially i-type (intrinsic) oxide semiconductor film that is extremely close to an i-type oxide semiconductor film. Note that "substantially intrinsic" means that the oxide semiconductor film contains extremely few (close to zero) carriers derived from a donor and has a carrier density of $1\times10^{17}/cm^3$ or lower, $1\times10^{16}/cm^3$ or lower, $1\times10^{15}/cm^3$ or lower, $1\times10^{14}/cm^3$ or lower, or $1\times10^{13}/cm^3$ or lower.

The transistor including an i-type or substantially i-type oxide semiconductor film can have extremely favorable off-state current characteristics. For example, the off-state drain current of the transistor including the oxide semiconductor film can be $1\times10^{-18}$ A or less, preferably $1\times10^{-21}$ A or less, more preferably $1\times10^{-24}$ A or less at room temperature (approximately 25° C.), or $1\times10^{-15}$ A or less, preferably $1\times10^{-18}$ A or less, more preferably $1\times10^{-21}$ A or less at 85° C. Note that the off state of an n-channel transistor refers to a state where a gate voltage is sufficiently lower than the threshold voltage. Specifically, the transistor is in an off state when the gate voltage is lower than the threshold voltage by 1 V or more, 2 V or more, or 3 V or more.

Next, a structure of an oxide semiconductor will be described.

An oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example of the amorphous oxide semiconductor film is an oxide semiconductor film in which no crystal part exists even in a microscopic region and which is entirely amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit inside a cube whose one side is less than 100 nm. Thus, there is a case where a crystal part included in the CAAC-OS film fits inside a cube whose one side is less than 10 nm, less than 5 nm, or less than 3 nm. The density of defect states of the CAAC-OS film is lower than that of the microcrystalline oxide semiconductor film. The CAAC-OS film will be described below in detail.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when a CAAC-OS film including an $InGaZnO_4$ crystal is analyzed by an out-of-plane method, a peak appears frequently when the diffraction angle ($2\theta$) is around $31°$. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction substantially perpendicular to the c-axis, a peak appears frequently when $2\theta$ is around $56°$. This peak is derived from the (110) plane of the $InGaZnO_4$ crystal. Here, analysis ($\phi$ scan) is performed under conditions where the sample is rotated around a normal vector of a sample surface as an axis ($\phi$ axis) with $2\theta$ fixed at around $56°$. When the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when $\phi$ scan is performed with $2\theta$ fixed at around $56°$.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface of the CAAC-OS film. Thus, for example, when the shape of the CAAC-OS film is changed by etching or the like, the c-axis might not be necessarily parallel to a normal vector of a formation surface or a normal vector of a top surface of the CAAC-OS film.

The degree of crystallinity in the CAAC-OS film is not necessarily uniform. For example, when crystal growth leading to the CAAC-OS film occurs from the vicinity of the top surface of the film, the degree of the crystallinity in the vicinity of the top surface is sometimes higher than that in the vicinity of the formation surface. Further, when an impurity is added to the CAAC-OS film, the crystallinity in a region to which the impurity is added is changed, and the degree of crystallinity in the CAAC-OS film varies depending on regions in some cases.

Note that when the CAAC-OS film with an $InGaZnO_4$ crystal is analyzed by an out-of-plane method, a peak of $2\theta$ may also be observed at around $36°$, in addition to the peak of $2\theta$ at around $31°$. The peak of $2\theta$ at around $36°$ indicates that a crystal having no c-axis alignment is included in part of the CAAC-OS film. It is preferable that in the CAAC-OS film, a peak of $2\theta$ appears at around $31°$ and a peak of $2\theta$ do not appear at around $36°$.

With the use of the CAAC-OS film in a transistor, variation in electrical characteristics of the transistor due to irradiation with visible light or ultraviolet light is small. Thus, the transistor has high reliability.

Note that an oxide semiconductor film may be a stacked film including two or more kinds of an amorphous oxide semiconductor film, a microcrystalline oxide semiconductor film, and a CAAC-OS film, for example.

This embodiment can be implemented in appropriate combination with any of the other embodiments.

(Embodiment 4)

In this embodiment, a cross-sectional structure of a transistor included in a register of a semiconductor device of one embodiment of the disclosed invention will be described with reference to drawings.

Figure 10:
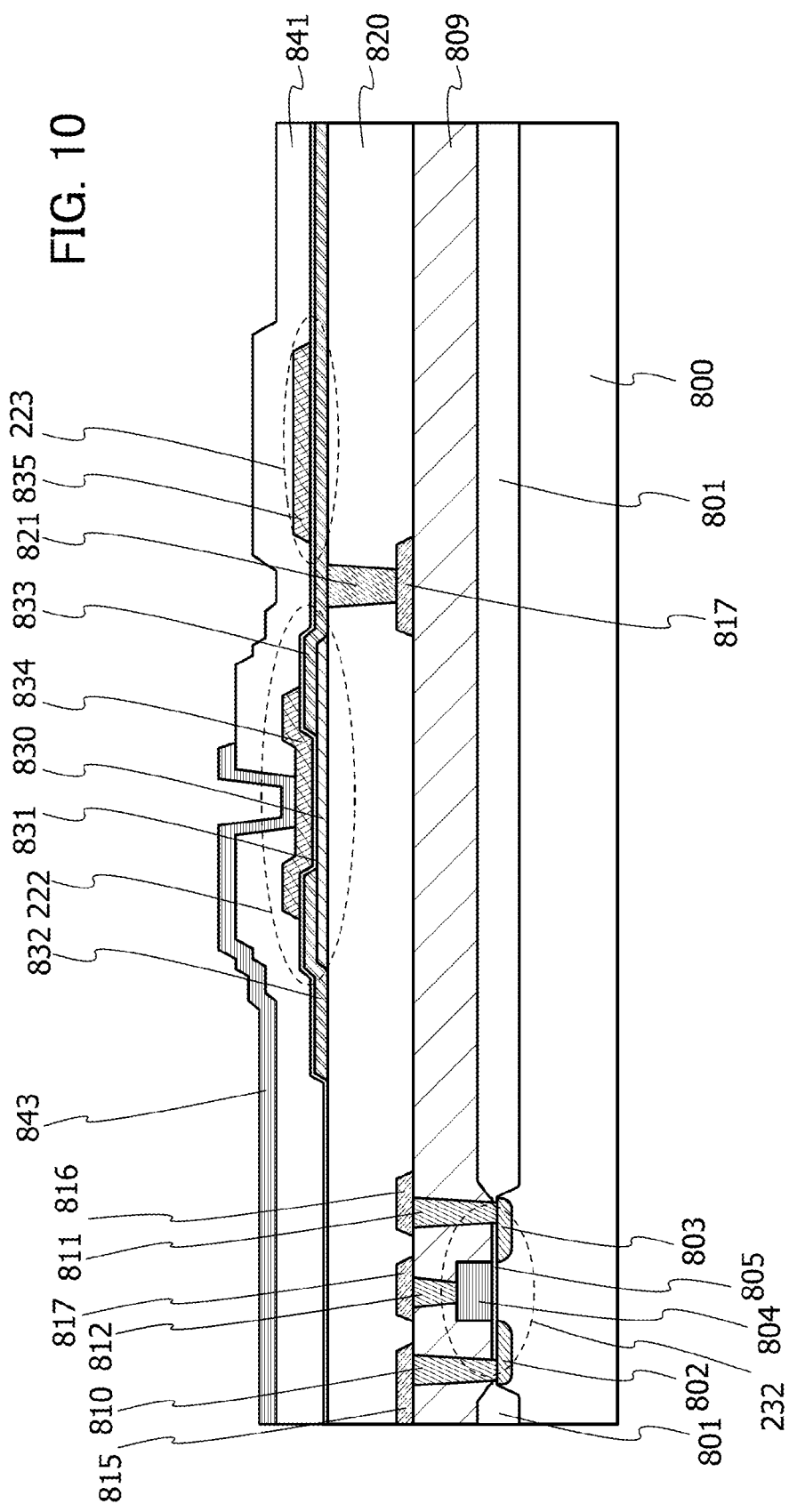
FIG. 10 is a cross-sectional view of a semiconductor device.

FIG. 10 illustrates an example of part of a cross-sectional structure of a semiconductor device of one embodiment of the present invention. FIG. 10 illustrates the transistor 222, the transistor 232, and the capacitor 223 shown in Embodiment 2.

In this embodiment, the transistor 232 is formed in a single crystal silicon substrate, and the transistor 222 including an oxide semiconductor layer is formed over the transistor 232. The transistor 232 may use a semiconductor thin film of silicon, germanium, or the like in an amorphous, microcrystalline, polycrystalline, or single crystal state as a semiconductor layer.

When the transistor 232 is formed using a thin silicon film, any of the following can be used, for example: amorphous silicon formed by sputtering or vapor phase growth such as plasma-enhanced CVD; polycrystalline silicon obtained by crystallization of amorphous silicon by laser annealing or the like; and single crystal silicon obtained by separation of a surface portion of a single crystal silicon wafer by implantation of hydrogen ions or the like into the silicon wafer.

When the transistor 222 contains an oxide semiconductor and the other transistors including the transistor 232 contain silicon in the register of the semiconductor device described in Embodiment 2, the number of transistors using an oxide semiconductor (oxide semiconductor transistors) is smaller than that of transistors using silicon (silicon transistors). Thus, stacking the transistor 222 over a silicon transistor makes the design rule for the transistor 222 less strict.

The structure in which a silicon transistor and an oxide semiconductor transistor are stacked can reduce the chip area of a semiconductor device. Since the number of silicon transistors is larger than that of oxide semiconductor transistors in one circuit block, the actual chip area of the semiconductor device depends on the number of silicon transistors. In addition, a volatile register including silicon transistors and a non-volatile register including a silicon transistor and an oxide semiconductor transistor can be fabricated on one chip through successive steps.

In FIG. 10, the n-channel transistor 232 is formed in a semiconductor substrate 800.

The semiconductor substrate 800 can be, for example, an n-type or p-type silicon substrate, germanium substrate, silicon germanium substrate, or compound semiconductor substrate (e.g., GaAs substrate, InP substrate, GaN substrate, SiC substrate, GaP substrate, GaInAsP substrate, or ZnSe substrate).

The transistor 232 is electrically isolated from another transistor by an element isolation insulating film 801. The element isolation insulating film 801 can be formed by a local oxidation of silicon (LOCOS) method, a trench isolation method, or the like.

Specifically, the transistor 232 includes impurity regions 802 and 803 that are formed in the semiconductor substrate 800 and function as a source region and a drain region, a gate electrode 804, and a gate insulating film 805 provided between the semiconductor substrate 800 and the gate electrode 804. The gate electrode 804 overlaps a channel formation region between the impurity regions 802 and 803 with the gate insulating film 805 positioned between the gate electrode 804 and the channel formation region.

An insulating film 809 is provided over the transistor 232. Openings are formed in the insulating film 809. Wirings 810 and 811 that are in contact with the impurity regions 802 and 803, respectively, and a wiring 812 that is in contact with the gate electrode 804 are formed in the openings.

The wiring 810 is connected to a wiring 815 formed over the insulating film 809. The wiring 811 is connected to a wiring 816 formed over the insulating film 809. The wiring 812 is connected to a wiring 817 formed over the insulating film 809.

An insulating film 820 is formed over the wirings 815 to 817. An opening is formed in the insulating film 820. In the opening, a wiring 821 that is connected to the wiring 817 is formed.

In FIG. 10, the transistor 222 and the capacitor 223 are formed over the insulating film 820.

The transistor 222 includes, over the insulating film 820, a semiconductor film 830 containing an oxide semiconductor, conductive films 832 and 833 that are positioned over the semiconductor film 830 and function as a source electrode and a drain electrode, a gate insulating film 831 over the semiconductor film 830 and the conductive films 832 and 833, and a gate electrode 834 that is positioned over the gate insulating film 831 and overlaps the semiconductor film 830 between the conductive films 832 and 833. The conductive film 833 is connected to the wiring 821.

A conductive film 835 is provided over the gate insulating film 831 to overlap the conductive film 833. A portion where the conductive films 833 and 835 overlap with each other with the gate insulating film 831 placed therebetween functions as the capacitor 223.

Although the capacitor 223 is provided over the insulating film 820 together with the transistor 222 in FIG. 10, the capacitor 223 may be provided below the insulating film 820 together with the transistor 232.

An insulating film 841 is provided over the transistor 222 and the capacitor 223. An opening is provided in the insulating film 841. A conductive film 843 that is in contact with the gate electrode 834 through the opening is provided over the insulating film 841.

Note that in FIG. 10, the transistor 222 includes the gate electrode 834 on at least one side of the semiconductor film 830; alternatively, the transistor 222 may include a pair of gate electrodes with the semiconductor film 830 positioned therebetween.

When the transistor 222 includes a pair of gate electrodes with the semiconductor film 830 positioned therebetween, a signal for controlling the on/off state may be supplied to one of the gate electrodes, and the other of the gate electrodes may be supplied with a potential from another element. In the latter case, potentials with the same level may be supplied to the pair of gate electrodes, or a fixed potential such as a ground potential may be supplied only to the other of the gate electrodes. By controlling the level of a potential supplied to the other of the gate electrodes, the threshold voltage of the transistor 222 can be controlled.

Figure 11A:
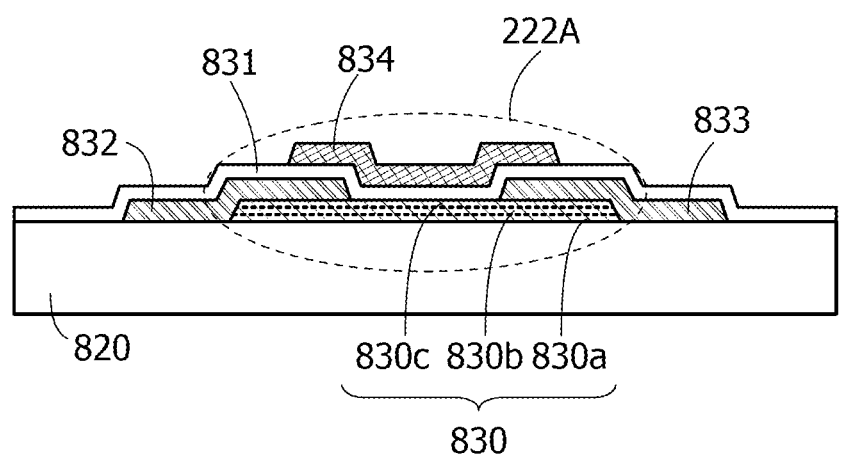
FIGS. 11A and 11B are cross-sectional views of transistors.
Figure 11B:
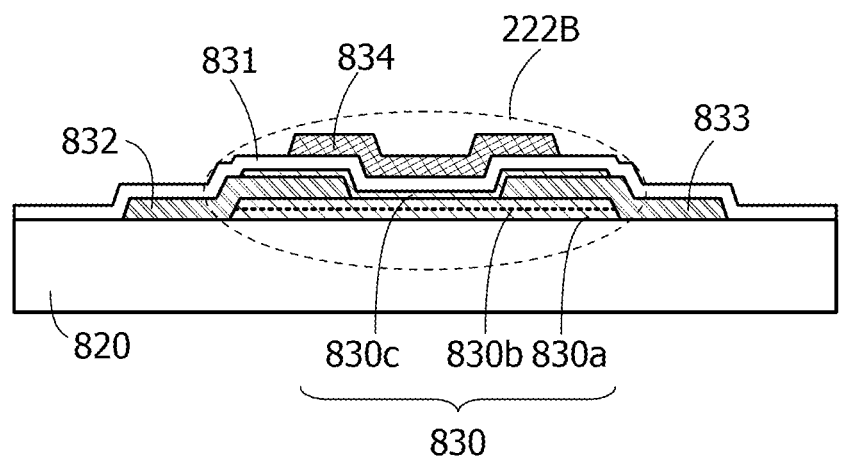

The semiconductor film 830 is not limited to a single oxide semiconductor film and may be a stack including a plurality of oxide semiconductor films. FIGS. 11A and 11B illustrate examples of the structure of the transistor 222 in which the semiconductor film 830 has a three-layer structure.

A transistor 222A illustrated in FIG. 11A includes the semiconductor film 830 over the insulating film 820 and the like, the conductive films 832 and 833 electrically connected to the semiconductor film 830, the gate insulating film 831, and the gate electrode 834 provided over the gate insulating film 831 so as to overlap the semiconductor film 830.

As the semiconductor film 830 in the transistor 222A, oxide semiconductor layers 830a to 830c are stacked in this order from the insulating film 820 side.

The oxide semiconductor layers 830a and 830c are each an oxide film that contains at least one of metal elements contained in the oxide semiconductor layer 830b. The energy at the bottom of the conduction band of the oxide semiconductor layers 830a and 830c is closer to a vacuum level than that of the oxide semiconductor layer 830b by 0.05 eV or more, 0.07 eV or more, 0.1 eV or more, or 0.15 eV or more and 2 eV or less, 1 eV or less, 0.5 eV or less, or 0.4 eV or less. The oxide semiconductor layer 830b preferably contains at least indium to increase carrier mobility.

Note that as in a transistor 222B illustrated in FIG. 11B, the oxide semiconductor layer 830c overlapping with the gate insulating film 831 may be partly provided over the conductive films 832 and 833.

This embodiment can be implemented in appropriate combination with any of the other embodiments.

(Embodiment 5)

In this embodiment, application examples of the semiconductor device described in the foregoing embodiment to an electronic component and to an electronic device including the electronic component will be described with reference to FIGS. 12A and 12B and FIGS. 13A to 13E.

Figure 12A:
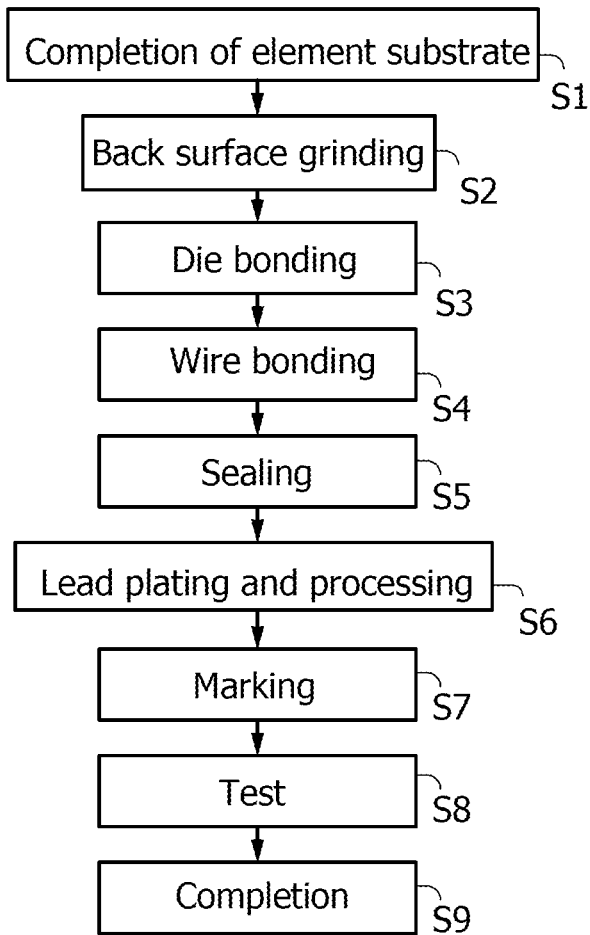
FIGS. 12A and 12B are a flow chart illustrating steps of fabricating a semiconductor device and a schematic perspective view of the semiconductor device.

FIG. 12A shows an example where the semiconductor device described in the foregoing embodiment is used to make an electronic component. Note that an electronic component is also referred to as semiconductor package or IC package. For the electronic component, there are various standards and names corresponding to the direction of terminals or the shape of terminals; hence, one example of the electronic component will be described in this embodiment.

A semiconductor device including the transistors illustrated in FIG. 10 of Embodiment 4 undergoes the assembly process (post-process) and is completed by using a combination of components detachable to a printed circuit board.

The post-process can be completed through steps shown in FIG. 12A. Specifically, after an element substrate obtained in the wafer process is completed (Step S1), a back surface of the substrate is ground (Step S2). The substrate is thinned in this step to reduce warpage or the like of the substrate in the wafer process and to reduce the size of the component itself.

A dicing step of grinding the back surface of the substrate to separate the substrate into a plurality of chips is performed. Then, a die bonding step of individually picking up separate chips to be mounted on and bonded to a lead frame is performed (Step S3). To bond a chip and a lead frame in the die bonding step, resin bonding, tape-automated bonding, or the like is selected as appropriate depending on products. Note that in the die bonding step, a chip may be mounted on and bonded to an interposer.

Next, wire bonding for electrically connecting a lead of the lead frame and an electrode on a chip through a metal wire is performed (Step S4). As a metal wire, a silver wire or a gold wire can be used. For wire bonding, ball bonding or wedge bonding can be employed.

A wire-bonded chip is subjected to a molding step of sealing the chip with an epoxy resin or the like (Step S5). With the molding step, the inside of the electronic component is filled with a resin, so that a circuit unit and the wire embedded in the component can be protected from external mechanical force and deterioration of characteristics due to moisture or dust can be reduced.

Subsequently, the lead of the lead frame is plated. Then, the lead is cut and processed into a predetermined shape (Step S6). With the plating process, corrosion of the lead can be prevented, and soldering for mounting the electronic component on a printed circuit board in a later step can be performed with higher reliability.

Next, printing process (marking) is performed on a surface of the package (Step S7). Then, through a final test step (Step S8), the electronic component is completed (Step S9).

The electronic component described above includes the semiconductor device of the foregoing embodiment; thus, it is possible to obtain the electronic component including the semiconductor device with high data processing speed and high data security. Since the electronic component includes the semiconductor device in which data can be processed at high speed at the time of stopping and resuming the supply of power and data security is high, power consumption is reduced and the degree of convenience is enhanced.

Figure 12B:
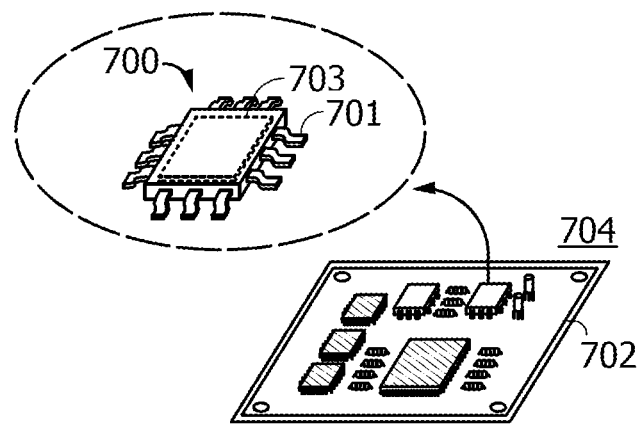

FIG. 12B is a perspective schematic diagram of a completed electronic component. FIG. 12B shows a perspective schematic diagram of a quad flat package (QFP) as an example of the electronic component. An electronic component 700 illustrated in FIG. 12B includes a lead 701 and a semiconductor device 703. The electronic component 700 in FIG. 12B is, for example, mounted on a printed circuit board 702. A plurality of electronic components 700 are used in combination to be electrically connected to each other over the printed wiring board 702; thus, a circuit board on which the electronic components are mounted (a circuit board 704) is completed. The completed circuit board 704 is provided in an electronic device or the like.

Next, the description is made on applications of the above electronic component to electronic devices such as a computer, a portable information appliance (including a mobile phone, a portable game machine, an audio reproducing device, and the like), electronic paper, a television device (also referred to as television or television receiver), and a digital video camera.

Figure 13A:
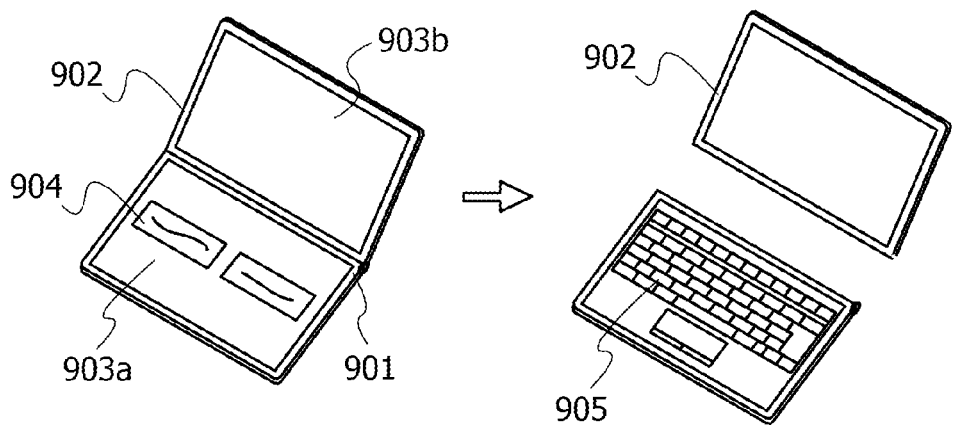
FIGS. 13A to 13E each illustrate an electronic device including a semiconductor device.

FIG. 13A illustrates a portable information appliance that includes a housing 901, a housing 902, a first display portion 903a, a second display portion 903b, and the like. A circuit board provided with an electronic device including the semiconductor device described in the foregoing embodiment is mounted on at least one of the housings 901 and 902. Thus, it is possible to achieve a portable information appliance with lower power consumption and higher degree of convenience.

Note that the first display portion 903a is a touch panel, and for example, as illustrated in the left of FIG. 13A, which of "touch input" and "keyboard input" is performed can be selected by a selection button 904 displayed on the first display portion 903a. Since selection buttons with a variety of sizes can be displayed, the information appliance can be easily used by people of any generation. For example, when "touch input" is selected, a keyboard 905 is displayed on the first display portion 903a as illustrated in the right of FIG. 13A. Thus, letters can be input quickly by key input as in the case of using a conventional information appliance, for example.

One of the first display portion 903a and the second display portion 903b can be detached from the portable information appliance as shown in the right of FIG. 13A. Providing the second display portion 903b with a touch input function makes the information appliance convenient to carry because the weight can be further reduced and the information appliance can operate with one hand while the other hand supports the housing 902.

The portable information appliance in FIG. 13A can be equipped with a function of displaying a variety of information (e.g., a still image, a moving image, and a text image); a function of displaying a calendar, a date, the time, or the like on the display portion; a function of operating or editing information displayed on the display portion; a function of controlling processing by various kinds of software (programs); and the like. Furthermore, an external connection terminal (e.g., an earphone terminal or a USB terminal), a recording medium insertion portion, and the like may be provided on the back surface or the side surface of the housing.

The portable information appliance illustrated in FIG. 13A may transmit and receive data wirelessly. Through wireless communication, desired book data or the like can be purchased and downloaded from an electronic book server.

Further, the housing 902 illustrated in FIG. 13A may be equipped with an antenna, a microphone function, or a wireless communication function to be used as a mobile phone.

Figure 13B:
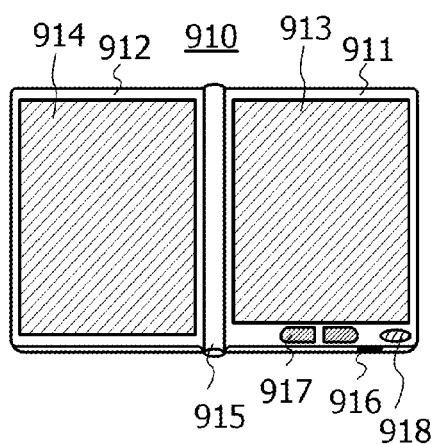

FIG. 13B illustrates an e-book reader 910 in which electronic paper is incorporated. The e-book reader has two housings of a housing 911 and a housing 912. The housing 911 and the housing 912 are provided with a display portion 913 and a display portion 914, respectively. The housings 911 and 912 are connected by a hinge 915 and can be opened or closed with the hinge 915 as an axis. The housing 911 is provided with a power switch 916, an operation key 917, a speaker 918, and the like. A circuit board provided with an electronic device including the semiconductor device described in the foregoing embodiment is mounted on at least one of the housings 911 and 912. Thus, it is possible to achieve an e-book reader with lower power consumption and higher degree of convenience.

Figure 13C:
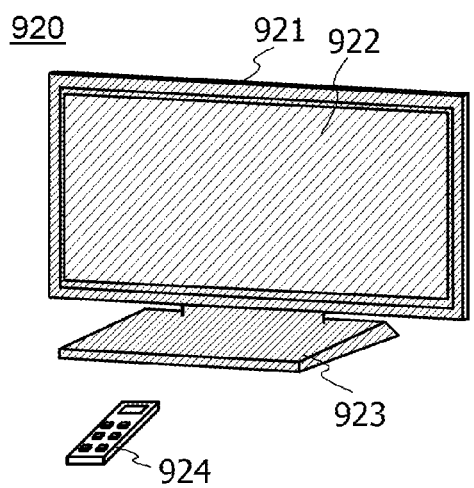

FIG. 13C illustrates a television device 920 including a housing 921, a display portion 922, a stand 923, and the like. The television device 920 can operate with a switch of the housing 921 and a separate remote controller 924. A circuit board provided with an electronic device including the semiconductor device of the foregoing embodiment is mounted on the housings 921 and the remote controller 924. Thus, it is possible to achieve a television device with lower power consumption and higher degree of convenience.

Figure 13D:
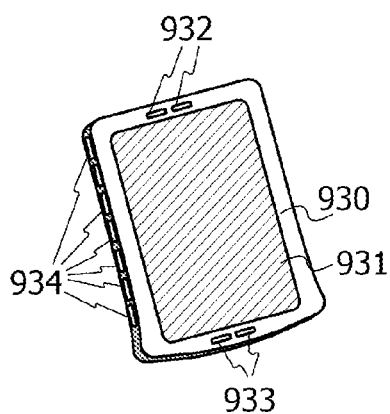

FIG. 13D illustrates a smartphone in which a main body 930 is provided with a display portion 931, a speaker 932, a microphone 933, an operation key 934, and the like. A circuit board provided with an electronic device including the semiconductor device of the foregoing embodiment is incorporated in the main body 930. Thus, it is possible to achieve a smartphone with lower power consumption and higher degree of convenience.

Figure 13E:
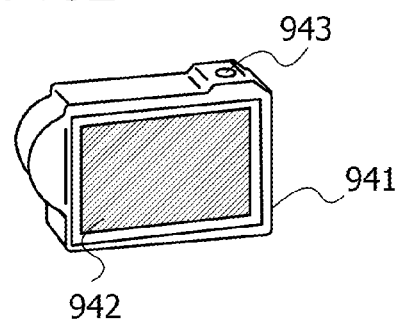

FIG. 13E illustrates a digital camera including a main body 941, a display portion 942, an operation switch 943, and the like. A circuit board provided with an electronic device including the semiconductor device described in the foregoing embodiment is incorporated in the main body 941. Thus, it is possible to achieve a digital camera with lower power consumption and higher degree of convenience.

As described above, the electronic device shown in this embodiment incorporates a circuit board provided with an electronic device including the semiconductor device described in any of the foregoing embodiments, thereby achieving lower power consumption and higher degree of convenience.

This application is based on Japanese Patent Application serial no. 2013-083550 filed with Japan Patent Office on Apr. 12, 2013, the entire contents of which are hereby incorporated by reference.

What is claimed is:

1. A semiconductor device comprising:
a processor comprising a volatile register and a non-volatile register, the non-volatile register including first data;
an encryption circuit compressing and encrypting the first data to create second data;
a non-volatile memory device storing the second data; and
a control circuit comparing the first data and third data obtained by decryption of the second data to verify whether the first data is the same as the third data or not.

2. The semiconductor device according to claim 1,
wherein the second data is input to and output from the encryption circuit, the control circuit, and the non-volatile memory device through a bus line.

3. The semiconductor device according to claim 1,
wherein a memory element in the non-volatile register comprises a transistor including an oxide semiconductor layer.

4. A semiconductor device comprising:
a processor comprising a volatile register and a non-volatile register;
an encryption circuit compressing and encrypting first data stored in the non-volatile register to create second data;
a non-volatile memory device storing the second data; and
a control circuit comprising a decoder circuit and a comparator circuit,
wherein the second data is decrypted to third data by the decoder circuit, and
wherein the first data and the third data are compared by the comparator circuit to verify whether the first data is the same as the third data or not.

5. The semiconductor device according to claim 4,
wherein the second data is input to and output from the encryption circuit, the control circuit, and the non-volatile memory device through a bus line.

6. The semiconductor device according to claim 4,
wherein a memory element in the non-volatile register comprises a transistor including an oxide semiconductor layer.

7. A semiconductor device comprising:
a processor comprising a volatile register and a non-volatile register;
an encryption circuit;
a non-volatile memory device; and
a control circuit,
wherein the non-volatile register is configured to save first data using data stored in the volatile register,
wherein the encryption circuit is configured to compress and encrypt the first data to create second data,
wherein the non-volatile memory device is configured to store the second data,
wherein the control circuit is configured to stop supply of a power to the processor, the encryption circuit, and the non-volatile memory device after the second data is stored in the non-volatile memory device,
wherein the control circuit comprises a decrypting circuit and a comparator circuit,
wherein the control circuit is configured to restart the supply of the power to the processor, the encryption circuit, and the non-volatile memory device,
wherein the decrypting circuit is configured to decrypt the second data to create third data, and
wherein the comparator circuit is configured to compare the first data and the third data to verify whether the first data is the same as the third data or not.

8. The semiconductor device according to claim 7,
wherein the second data is input to and output from the encryption circuit, the control circuit, and the non-volatile memory device through a bus line.

9. The semiconductor device according to claim 7,
wherein a memory element in the non-volatile register comprises a transistor including an oxide semiconductor layer.

10. The semiconductor device according to claim 7,
wherein the processor is configured to transmit the first data to the volatile register in the case where the third data and the first data are the same, and
wherein the processor is configured to discard the first data when the first data and the third data are not the same.

* * * * *